US012017451B2

(12) United States Patent
Osakabe et al.

(10) Patent No.: US 12,017,451 B2
(45) Date of Patent: *Jun. 25, 2024

(54) INKJET RECORDING DEVICE INCLUDING CONTROLLER CONTROLLING VALVE TO CLOSE AIR COMMUNICATION OPENING FORMED IN INK STORAGE PORTION IN CASE OF OCCURRENCE OF ABNORMALITY

(71) Applicant: BROTHER KOGYO KABUSHIKI KAISHA, Nagoya (JP)

(72) Inventors: Yoshinori Osakabe, Seto (JP); Fumio Nakazawa, Okazaki (JP); Taichi Shirono, Nagoya (JP); Sosuke Kuroyanagi, Nishio (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,976

(22) Filed: Apr. 10, 2023

(65) Prior Publication Data

US 2023/0356523 A1 Nov. 9, 2023

Related U.S. Application Data

(63) Continuation of application No. 17/210,904, filed on Mar. 24, 2021, now Pat. No. 11,654,675.

(30) Foreign Application Priority Data

Mar. 31, 2020 (JP) ................................ 2020-062033

(51) Int. Cl.
*B41J 2/045* (2006.01)
*B41J 2/175* (2006.01)

(52) U.S. Cl.
CPC ......... *B41J 2/0451* (2013.01); *B41J 2/04586* (2013.01); *B41J 2/17596* (2013.01)

(58) Field of Classification Search
CPC ............................ B41J 2/0451; B41J 2/04586
See application file for complete search history.

(56) References Cited

U.S. PATENT DOCUMENTS 11,654,675 B2 * 5/2023 Osakabe ............. B41J 2/17513 347/14
2008/0007590 A1 1/2008 Lee
(Continued)

FOREIGN PATENT DOCUMENTS

CN 101100135 A 1/2008
CN 101758664 A 6/2010
(Continued)

OTHER PUBLICATIONS

International Search Report and Written Opinion issued in corresponding International Patent Application No. PCT/JP2021/013100, dated May 25, 2021.
(Continued)

*Primary Examiner* — Thinh H Nguyen
(74) *Attorney, Agent, or Firm* — Merchant & Gould P.C.

(57) ABSTRACT

An inkjet recording device includes: a head including a nozzle configured to eject ink toward a recording medium; a storage portion storing therein ink and formed with an air communication opening allowing an interior of the storage portion to be communicated with an outside thereof; a valve movable between an opening position opening the air communication opening and a closing position closing the air communication opening; an actuator configured to move the valve; a state sensor configured to output a detection signal based on the state of the inkjet recording device; and a controller configured to perform: (a) determining, on the basis of the detection signal, whether the inkjet recording
(Continued)

device has an abnormality; and (b) controlling, in a case where determination is made in (a) that the inkjet recording device has an abnormality, the actuator to move the valve to the closing position from the opening position.

14 Claims, 12 Drawing Sheets

(56) References Cited

U.S. PATENT DOCUMENTS

| | | | |
|---|---|---|---|
| 2008/0158307 | A1 | 7/2008 | Nitta et al. |
| 2009/0174735 | A1 | 7/2009 | Yamada |
| 2010/0156984 | A1 | 6/2010 | Chikamoto |
| 2014/0184709 | A1 | 7/2014 | Qian et al. |
| 2015/0239249 | A1 | 8/2015 | Plummer et al. |
| 2017/0151802 | A1 | 6/2017 | Toba et al. |
| 2019/0001689 | A1 | 1/2019 | Ishida et al. |

FOREIGN PATENT DOCUMENTS

| | | | |
|---|---|---|---|
| CN | 107097525 | A | 8/2017 |
| CN | 110816069 | A | 2/2020 |
| JP | 2009-160807 | A | 7/2009 |
| JP | 2011-42120 | A | 3/2011 |
| JP | 2014-151589 | A | 8/2014 |
| JP | 2017-094658 | A | 6/2017 |
| JP | 2018-108647 | A | 7/2018 |

OTHER PUBLICATIONS

Office Action issued in related corresponding Japanese Application No. 2020-062033, dated Nov. 7, 2023.

Chinese Office Action issued in corresponding application 202180023796.0, dated Nov. 6, 2023.

Office Action issued in corresponding Chinese Patent Application 2021800237963.0, Apr. 9, 2024.

* cited by examiner

INKJET RECORDING DEVICE INCLUDING CONTROLLER CONTROLLING VALVE TO CLOSE AIR COMMUNICATION OPENING FORMED IN INK STORAGE PORTION IN CASE OF OCCURRENCE OF ABNORMALITY

REFERENCE TO RELATED APPLICATIONS

This application is a continuation of U.S. patent application Ser. No. 17/210,904, filed Mar. 24, 2021, now U.S. Pat. No. 11,654,675, which claims priority from Japanese Patent Application No. 2020-062033 filed Mar. 31, 2020. The entire contents of the aforementioned applications are incorporated herein by reference.

BACKGROUND ART

Technical Field

The present disclosure relates to an inkjet recording device for recording an image on a recording medium by ejecting ink thereto.

Background

In an inkjet recording device provided with a head, a meniscus that has a concave shape as viewed from the outside is formed in each nozzle of the head in order to stabilize ink ejection.

In an inkjet recording device in which ink is supplied to a head from an ink storage portion provided in a carriage on which the head is mounted, a concave meniscus is formed in each nozzle by setting an interior of the ink storage portion to negative pressure. Here, excessive negative pressure may result in the meniscus being broken. Therefore, the negative pressure of the interior of the ink storage portion needs to be maintained within a proper pressure range.

Japanese Patent Application Publication No. 2017-94658 discloses a printer including a valve. The valve is opened when the level of the negative pressure in an ink storage portion becomes great, thereby introducing air into the interior of the ink storage portion. When this introduction of air returns the level of the negative pressure into a proper pressure range, the valve is closed. In this way, in the disclosed printer, the valve is automatically opened and closed based on the level of the negative pressure in the ink storage portion to maintain the internal negative pressure within the proper range.

DESCRIPTION

Summary

However, with the conventional inkjet recording device described above, ink leakage may occur by permeation of ink into a recording medium from the nozzles due to contact of the nozzles with the recording medium. This contact may occur when jamming of the recording medium occurs in the inkjet recording device during an image recordation to the recording medium. The ink leakage causes reduction in amount of ink in the ink storage portion, which leads to pressure decrease (elevation in the level of negative pressure) in the storage portion. Hence, the permeation of ink into the recording medium can be suppressed.

However, according to the printer disclosed in the '658 Publication, the valve is temporarily opened in response to decrease in the internal pressure (rise in the level of negative pressure), so that the level of the pressure in the storage portion is returned into the proper pressure range. As a result, the permeation of ink in the nozzles into the recording medium is again accelerated. As such, according to the disclosed printer, ink may be endlessly leaked in case of occurrence of ink permeation into the recording medium.

In view of the foregoing, it is an object of the disclosure to provide an inkjet recording device capable of reducing ink leakage from nozzles.

In order to attain the above and other objects, according to one aspect, the disclosure provides an inkjet recording device configured to perform an image recordation on a recoding medium by ejecting ink thereto. The inkjet recording device includes: a head, a support member, a storage portion, a valve, an actuator, a state sensor, and a controller. The head includes a nozzle configured to eject ink to the recording medium. The support member supports the head. The storage portion is configured to store therein ink. The storage portion has a part positioned above the nozzle. The storage portion has an air communication opening allowing an interior of the storage portion to be communicated with an outside of the storage portion. The valve is movable between: an opening position in which the valve opens the air communication opening; and a closing position in which the valve closes the air communication opening. The actuator is configured to move the valve. The state sensor is configured to detect a state of the inkjet recording device and to output a detection signal based on the detected state. The controller is configured to perform: (a) determining, on the basis of the detection signal, whether the inkjet recording device has an abnormality; and (b) controlling, in a case where determination is made in (a) that the inkjet recording device has an abnormality, the actuator to move the valve to the closing position from the opening position.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Figure 1:
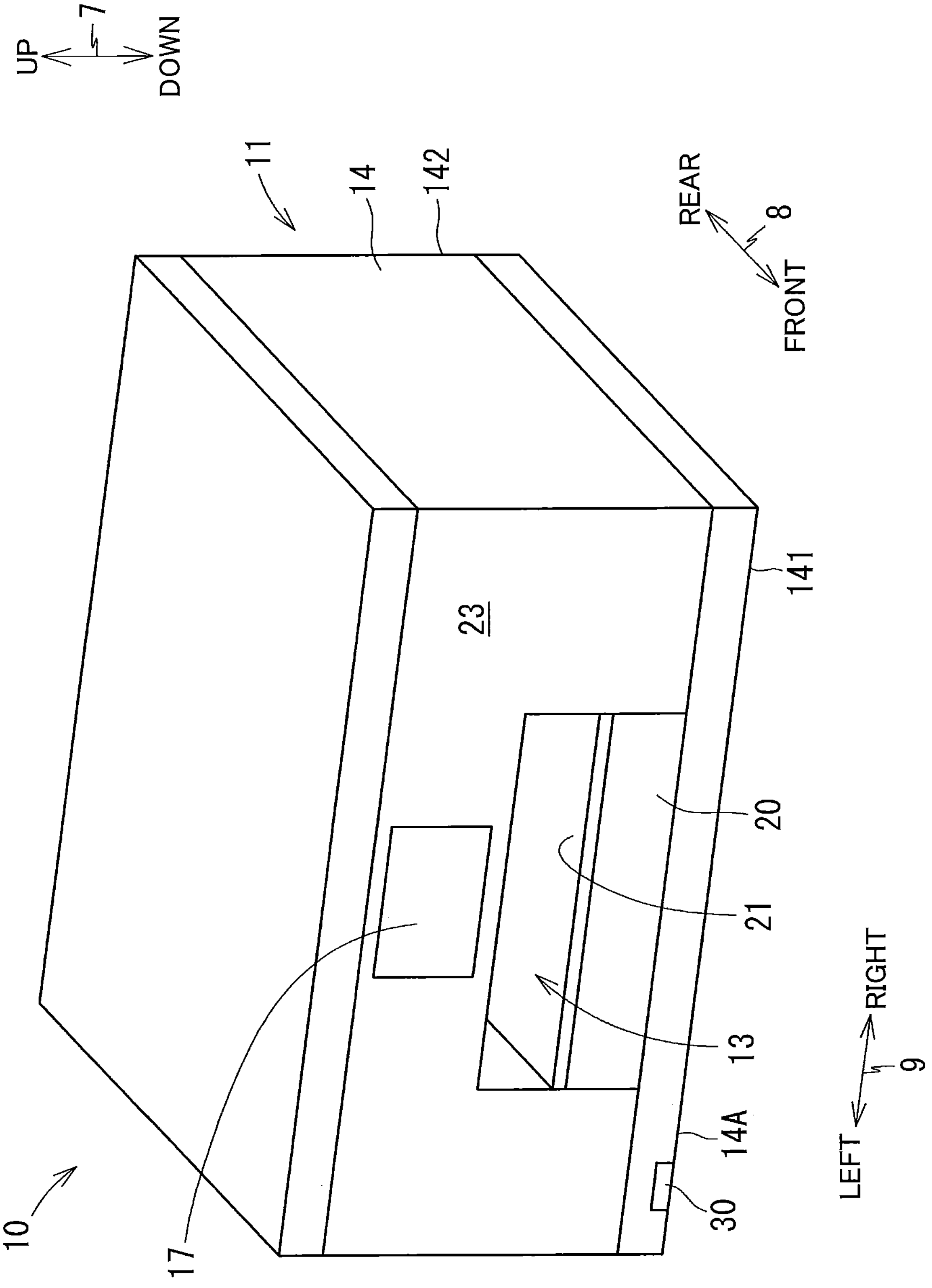
FIG. 1 is a perspective view of a multifunction peripheral 10 according to one embodiment.

Hereinafter, a multifunction peripheral 10 according to one embodiment of the present disclosure will be described with reference to the accompanying drawings. In the following description, the directions indicated by the arrows in the drawings will be referred to the frontward direction, the rearward direction, the upward direction, the downward direction, the leftward direction, and the rightward direction. Further, the bi-direction indicated by two of the arrows that are directed opposite to each other will be referred to as the front-rear direction, the up-down direction, and the left-right direction. The up-down direction 7 is defined based on a state where the multifunction peripheral 10 is installed so as to be usable (the state illustrated in FIG. 1). The front-rear direction 8 is defined such that a front surface 23 formed with an opening 13 (described later) is at the front side of the multifunction peripheral 10. The left-right direction 9 is defined based on the front view of the multifunction peripheral 10. The up-down direction 7, the front-rear direction 8, and the left-right direction 9 are perpendicular to one another.

[Overall Structure of Multifunction Peripheral 10]

As illustrated in FIG. 1, the multifunction peripheral 10 includes a housing 14 having a generally rectangular parallelepiped shape. A printer portion 11 is provided in a lower portion of the housing 14. The multifunction peripheral 10 has various function such as facsimile function and printing function. The multifunction peripheral 10 has, as the printing function, a function of performing image recordation on one side of a sheet 12 (see FIG. 2) with an inkjet recording system. Incidentally, the multifunction peripheral 10 may be of the type configured to perform image recordation on both sides of the sheet 12. The multifunction peripheral 10 is an example of the inkjet recording device. The sheet 12 is an example of the recording medium.

An operating portion 17 is provided at an upper portion of the housing 14. The operating portion 17 includes buttons configured to be operated for instruction of image recordation and various settings, and a liquid crystal display configured to display various information. In this embodiment, the operating portion 17 is configured of a touch panel having both the functions of the buttons and liquid crystal display. The operating portion 17 is an example of the receiving portion.

Figure 2:
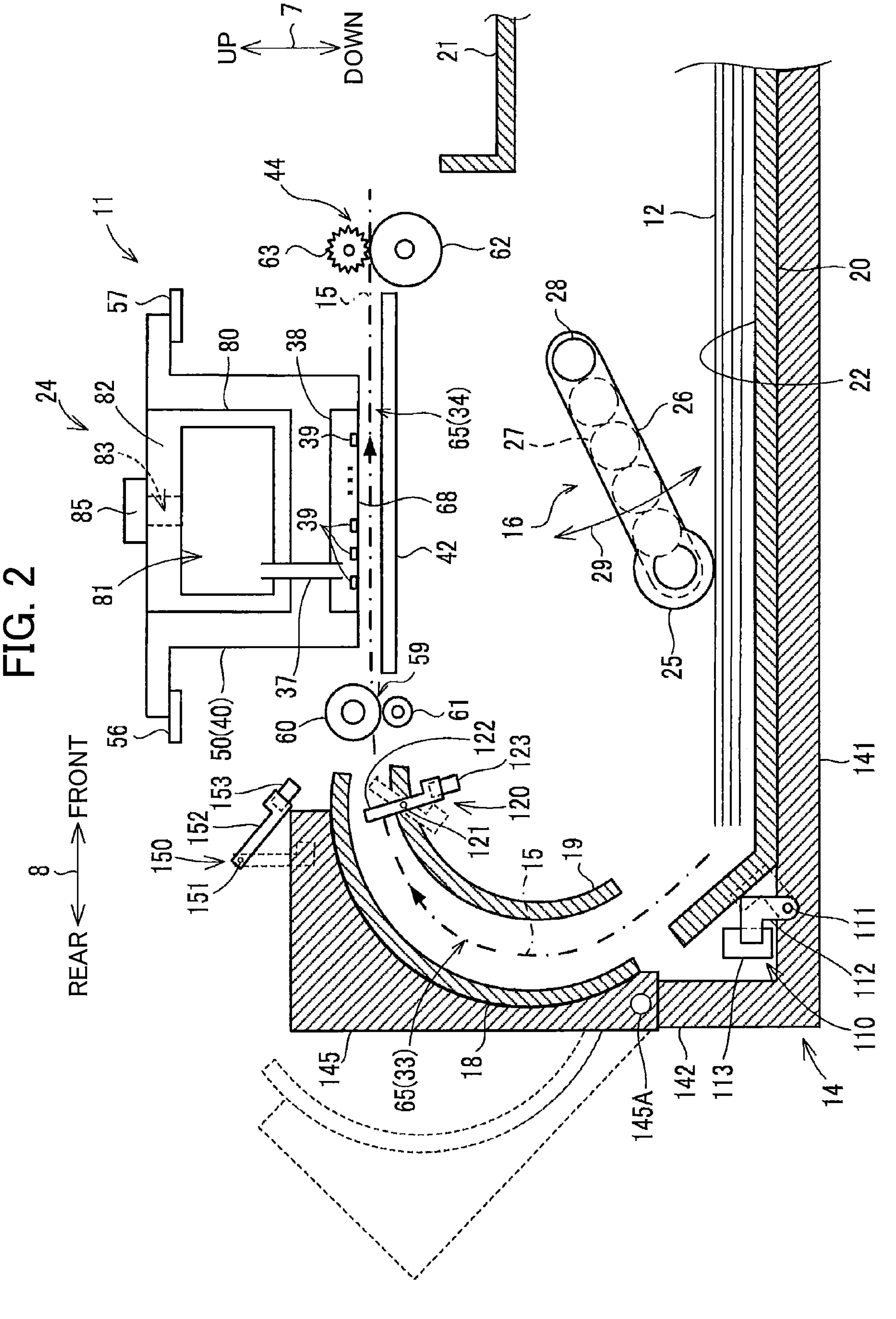
FIG. 2 is a schematic vertical cross-sectional view illustrating the internal structure of a printer portion 11.
Figure 6:
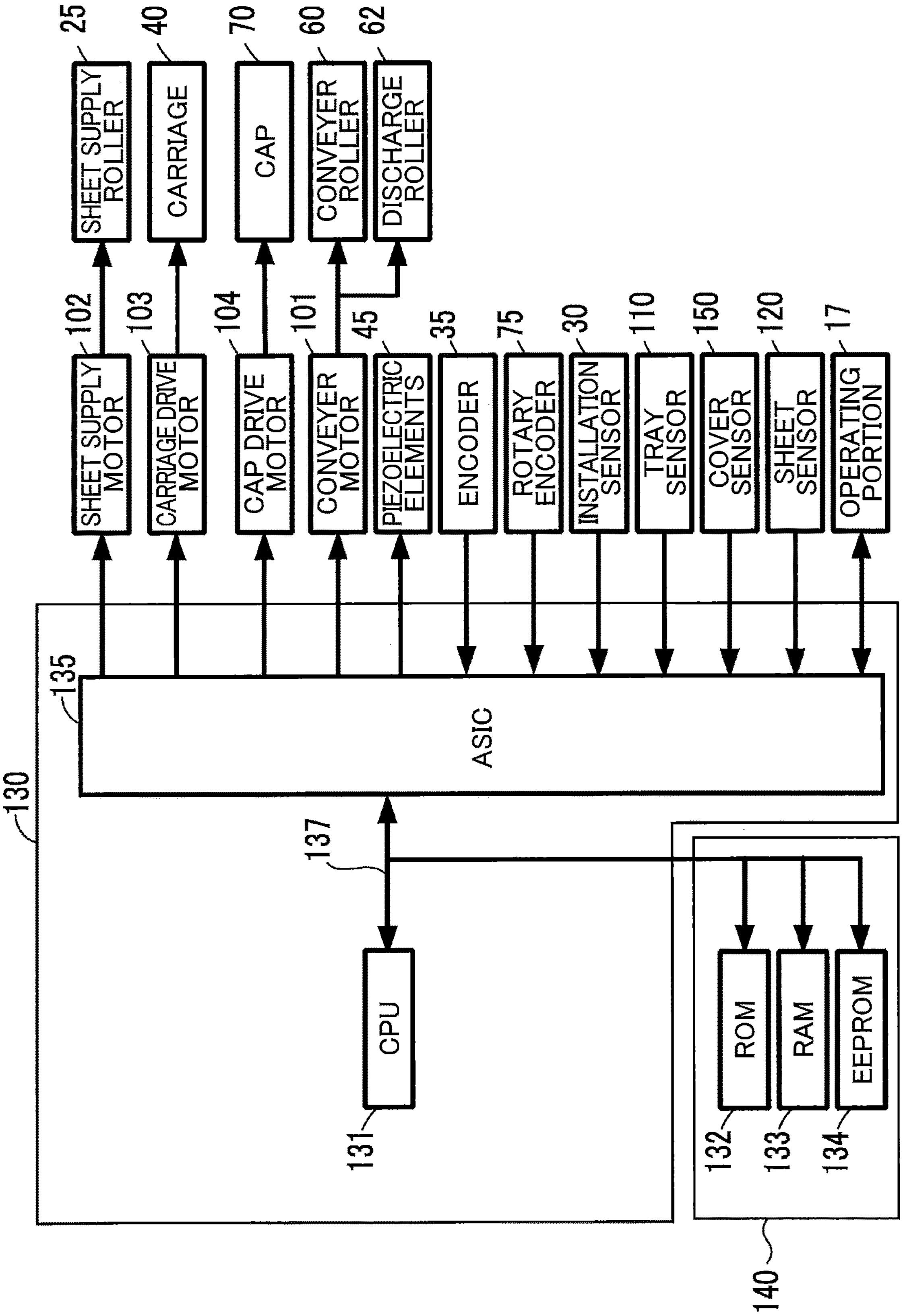
FIG. 6 is a functional block diagram of the multifunction peripheral 10.

As illustrated in FIG. 2, the printer portion 11 includes a sheet tray 20, a sheet feeding unit 16, an outer guide member 18, an inner guide member 19, a pair of conveyer rollers 59, a pair of discharge rollers 44, a platen 42, a recording unit 24, a cap 70 (FIG. 3), an electromagnetic valve 92 (FIG. 3), a sheet sensor 120, a rotary encoder 75 (FIG. 6), a controller 130 (FIG. 6), and a memory 140 (FIG. 6). These are positioned in an interior of the housing 14. Further, in the inside of the housing 14, there are provided various state sensors configured to detect the state of the multifunction peripheral 10 and to output signals based on the detection results. The state sensors in the present embodiment includes an installation sensor 30, a tray sensor 110, a cover sensor 150, an encoder 35, and the sheet sensor 120. However, the state sensors are not limited to these, and sensors employed in well-known multifunction peripherals are also available as the state sensors.

As illustrated in FIG. 1, the installation sensor 30 is positioned at a lower surface 14A of the housing 14. The installation sensor 30 is configured to detect whether the multifunction peripheral 10 is installed. That is, the installation sensor 30 is configured to detect the installation state of the multifunction peripheral 10. Various types of known sensors are available as the installation sensor 30.

In a state where the multifunction peripheral 10 is installed (placed) on a desk and the like, the lower surface 14A of the housing 14 and the installation sensor 30 positioned at the lower surface 14A are in contact with an upper surface of the desk. At this time, the installation sensor 30 outputs one of a high-level signal and a low-level signal to the controller 130. In the present embodiment, the installation sensor 30 outputs the high-level signal to the controller 130 in a state where the multifunction peripheral 10 is installed. The upper surface of the desk and the like is an example of the installation surface. The high-level signal from the installation sensor 30 is an example of the installation signal and is also an example of the detection signal.

On the other hand, in a state the multifunction peripheral 10 is separated from the upper surface of the desk by, for example, user's lifting of the multifunction peripheral 10, the lower surface 14A and the installation sensor 30 are out of contact with (i.e., are not in contact with) the upper surface of the disk. At this time the installation sensor 30 outputs the other of the high-level signal and low-level signal to the controller 130. In the present embodiment, the installation sensor 30 outputs the low-level signal in a state where the multifunction peripheral 10 is not installed. The low-level signal from the installation sensor 30 is an example of the uninstallation signal and is also an example of the detection signal.

[Sheet Tray 20]

As illustrated in FIG. 1, the opening 13 is formed at the front surface 23 of the printer portion 11. The sheet tray 20 is movable in the front-rear direction 8 through the opening 13 so that the sheet tray 20 is insertable into and removable from the housing 14. More specifically, the sheet tray 20 is movable between a sheet supply position (illustrated in FIGS. 1 and 2) in which the sheet tray 20 is attached to the housing 14 and a sheet non-supply position in which the sheet tray 20 is removed from the housing 14. The sheet tray 20 is moved to the sheet supply position by being inserted rearward relative to the housing 14. The sheet tray 20 is moved to the sheet non-supply position by being pulled frontward from the housing 14. The sheet tray 20 is an example of the tray.

The sheet tray 20 has a box shape having upper open end, and is configured to accommodate therein the sheets 12. As illustrated in FIG. 2, the sheets 12 are supported in a stacked state on a bottom plate 22 of the sheet tray 20. A discharge tray 21 is positioned above a front portion of the sheet tray 20. The sheet 12 on which an image has been recorded by the recording unit 24 is discharged therefrom and then is supported on an upper surface of the discharge tray 21.

As illustrated in FIG. 2, the sheet 12 supported on the sheet tray 20 can be conveyed to a sheet conveying passage 65 in a state where the sheet tray 20 is at the sheet supply position.

The tray sensor 110 is positioned at a rear lower internal portion of the housing 14. The tray sensor 110 is supported by a lower wall 141 of the housing 14. The tray sensor 110 is configured to detect whether the sheet tray 20 is positioned at the sheet supply position. Various types of well-known tray sensors may be available as the tray sensor 110. For example, as illustrated in FIG. 2, the tray sensor 110 according to the present embodiment includes a shaft 111, a detection probe 112, and an optical sensor 113. The detection probe is pivotally movable about an axis of the shaft 111. The optical sensor 113 includes a light emitting element and a light receiving element configured to receive light emitted from the light emitting element.

The detection probe 112 is in a posture indicated by the broken line in FIG. 2 in a state where the sheet tray 20 is not at the sheet supply position. At this time, an upper portion of the detection probe 112 is positioned in a space where a rear end portion of the sheet tray 20 is positioned when the sheet tray 20 is at the sheet supply position. The detection probe 112 is offset from an optical path extending from the light emitting element to the light receiving element, and thus, the detection probe 112 allows the light to pass through the optical path. Hence, a high-level signal is outputted from the optical sensor 113 to the controller 130. The detection probe 112 is urged to the posture indicated by the broken line in FIG. 2 by a spring (not illustrated). The high-level signal from the optical sensor 113 of the tray sensor 110 is an example of the feeding impossibility signal and is also an example of the detection signal.

When the sheet tray 20 is inserted into the housing 14 and moved from the sheet non-supply position to the sheet supply position, the rear end portion of the sheet tray 20 pushes the detection probe 112 rearward. Hence, the detection probe 112 is pivotally moved from the posture indicated by the broken line to the posture indicated by the solid line in FIG. 2. As a result, the rear upper end portion of the detection probe 112 enters the optical path and blocks the light. Hence, a low-level signal is outputted from the optical sensor 113 to the controller 130. The low-level signal from the optical sensor 113 of the tray sensor 110 is an example of the feeding possibility signal and is also an example of the detection signal.

[Sheet Feeding Unit 16]

As illustrated in FIG. 2, the sheet feeding unit 16 is positioned below the recording unit 24 and above the bottom plate 22 of the sheet tray 20. The sheet feeding unit 16 includes a sheet feeding roller 25, a sheet feeding arm 26, a power transmission mechanism 27, and a shaft 28. The sheet feeding roller 25 is rotatably supported by a tip end portion of the sheet feeding arm 26. The sheet feeding arm 26 has a base end portion at which the shaft 28 is positioned. The sheet feeding arm 26 is pivotally movable about the axis of the shaft 28 along the directions indicated by an arrow 29. Hence, the sheet feeding roller 25 is contactable with and separable from the sheet tray 20 or the uppermost sheet 12 of the sheet stack supported on the sheet tray 20.

The power transmission mechanism 27 includes a gear train (a plurality of gears) and is configured to transmit the driving force of a sheet supply motor 102 (see FIG. 6) to the sheet feeding roller 25 to rotate the same. When the sheet supply roller 25 is rotated, the sheet 12 that is positioned uppermost in the sheet stack supported on the sheet tray 20 and is in contact with the sheet supply roller 25 is conveyed to a sheet conveying passage 65. Incidentally, the power transmission mechanism 27 may include, instead of the gear train, a belt looped over the shaft 28 and the shaft of the sheet feeding roller 25.

[Sheet Conveying Passage 65]

As illustrated in FIG. 2, the sheet conveying passage 65 extends from the rear end portion of the sheet tray 20. The sheet conveying passage 65 includes a curved portion 33 and a linear portion 34. The curved portion 33 is U-shaped extending diagonally upward and rearward and then extending frontward. The linear portion 34 extends approximately in the front-rear direction 8.

The curved portion 33 is defined by the outer guide member 18 and the inner guide member 19, which face each other and are spaced away from each other by a predetermined interval. The outer guide member 18 and inner guide member 19 extend in the left-right direction 9. A part of the linear portion 34 is defined by the recording unit 24 and the platen 42, which face each other with a predetermined interval therebetween.

The sheet 12 supported by the sheet tray 20 is conveyed along the curved portion 33 by the sheet feeding roller 25, and reaches the pair of conveyer rollers 59. Then, the sheet 12 is nipped and conveyed frontward toward the recording unit 24 along the linear portion 34 by the pair of conveyer rollers 59. After the sheet 12 has reached the position immediately below the recording unit 24, the sheet 12 is subjected to image recordation by the recording unit 24. Thereafter, the sheet 12 having an image recorded thereon is conveyed frontward along the linear portion 34 and discharged onto the discharge tray 21. In this way, the sheet 12 is conveyed in a conveying direction 15 indicated by the one-dotted chain line in FIG. 2.

[Movable Cover 145]

As illustrated in FIG. 2, a movable cover 145 is supported by a rear wall 142 of the housing 14 so as to be pivotally movable about the axis of a shaft 145A extending in the left-right direction 9. The shaft 145A is positioned at a lower end portion of the movable cover 145. However, the position of the shaft 145A is not limited to this. The movable cover 145 is an example of the cover.

The movable cover 145 is pivotally movable between a closed position and an open position indicated by a solid line and a broken line in FIG. 2, respectively. The outer guide member 18 is attached to the movable cover 145. That is, the outer guide member 18 is pivotally movable integrally with the movable cover 145. The outer guide member 18 constitutes the curved portion 33 when the movable cover 145 is at the closed position. At this time, the curved portion 33 is blocked from an outside of the housing 14. The curved portion 33 is exposed to the outside of the housing 14 when the movable cover 145 is at the open position. Hence, removal of the sheet jammed in the sheet conveying passage 65 can be facilitated for a user.

The cover sensor 150 is positioned at a rear upper internal portion of the housing 14. The cover sensor 150 is supported by a frame (not illustrated) of the housing 14. The cover sensor 150 is configured to detect the position of the movable cover 145. Note that, well-known movable covers may be available as the cover sensor 150. The cover sensor 150 in the present embodiment includes, for example, a shaft 151, a detection probe 152 pivotally movable about the axis of the shaft 151, and an optical sensor 153 including a light emitting element and a light receiving element configured to receive light emitted from the light emitting element.

In a state where the movable cover 145 is at the open position, the detection probe 152 is in the posture indicated by the broken line in FIG. 2 because of its own weight. At this time, a tip end portion of the detection probe 152 is positioned in a space where an upper portion of the movable cover 145 is positioned when the movable cover 145 is at the closed position. The detection probe 152 is offset from an optical path extending from the light emitting element to the light receiving element, and thus, the detection probe 152 allows the light to pass through the optical path. Hence, a high-level signal is outputted from the optical sensor 153 to the controller 130. The high-level signal from the optical sensor 153 of the cover sensor 150 is an example of the open signal and is also an example of the detection signal.

When the movable cover 145 is pivotally moved from the open position to the closed position, the upper end portion of the movable cover 145 pushes the detection probe 152 frontward. Hence, the detection probe 152 is pivotally moved from the posture indicated by the broken line to the posture indicated by the solid line in FIG. 2. As a result, the tip end portion of the detection probe 152 enters into the optical path and blocks the light. Hence, a low-level signal is outputted from the optical sensor 153 to the controller 130. Note that, although the detection probe 152 is urged by its own weight toward the posture indicated by the broken line in FIG. 2 in the present embodiment, alternative manners may be employed for urging the detection probe 152 toward the posture indicated by the broken line in FIG. 2. For example, the detection probe 152 may be urged by a spring toward the posture indicated by the broken line in FIG. 2. The low-level signal from the optical sensor 153 of the cover sensor 150 is an example of the close signal and is also an example of the detection signal.

Incidentally, movement of the movable cover 145 between the closed position and the open position may be performed by alternative motions other than pivotal movement. For example, the movable cover 145 may be slidingly moved upward from the closed position to the open position. Alternatively, there may be employed a configuration in which the movable cover 145 is attachable to and detachable from the housing 14. In this case, the closed position is provided by attaching the movable cover 145 to the housing 14, and the open position is provided by detaching the movable cover 145 from the housing 14.

[Pair of Conveyer Rollers 59 and Pair of Discharge Rollers 44]

As illustrated in FIG. 2, the pair of conveyer rollers 59 is positioned at the linear portion 34. The pair of discharge rollers 44 is positioned at the linear portion 34 and downstream of the pair of conveyer rollers 59 in the conveying direction 15.

The pair of conveyer rollers 59 includes a conveyer roller 60 and a pinch roller 61 positioned below and facing the conveyer roller 60. The pinch roller 61 is urged toward the conveyer roller 60 by an elastic member such as a coil spring (not illustrated). The pair of conveyer rollers 59 is configured to nip the sheet 12 between the conveyer roller 60 and the pinch roller 61.

The pair of discharge rollers 44 includes a discharge roller 62 and a spur roller 63 positioned above and facing the discharge roller 62. The spur roller 63 is urged toward the discharge roller 62 by an elastic member such as a coil spring (not illustrated). The pair of discharge rollers 44 is configured to nip the sheet 12 between the discharge roller 62 and the spur roller 63.

The conveyer roller 60 and the discharge roller 62 receive the drive force from a conveyer motor 101 (see, FIG. 6) to rotate. When the conveyer roller 60 rotates in a state where the sheet 12 is nipped by the pair of conveyer rollers 59, the sheet 12 is conveyed in the conveying direction 15 onto the platen 42 by the pair of conveyer rollers 59. Further, when the discharge roller 62 rotates in a state where the sheet 12 is nipped by the pair of discharge rollers 44, the sheet 12 is conveyed in the conveying direction 15 and discharged onto the discharge tray 21 by the pair of discharge rollers 44. Incidentally, there may be employed a single common motor serving as both the conveyer motor 101 and the sheet supply motor 102. In this case, power transmission paths from the common motor to each of the conveyer roller 60 and the discharge roller 62 are switchable from each other.

Incidentally, instead of rollers such as the pair of conveyer rollers 59 and the pair of discharge rollers 44, a conveyer belt may be available for conveying the sheet 12.

[Platen 42]

As illustrated in FIG. 2, the platen 42 is positioned at the linear portion 34 of the sheet conveying passage 65. The platen 42 faces the recording unit 24 in the up-down direction 7. The platen 42 is configured to support the sheet 12 conveyed along the sheet conveying passage 65 from below.

Figure 3:
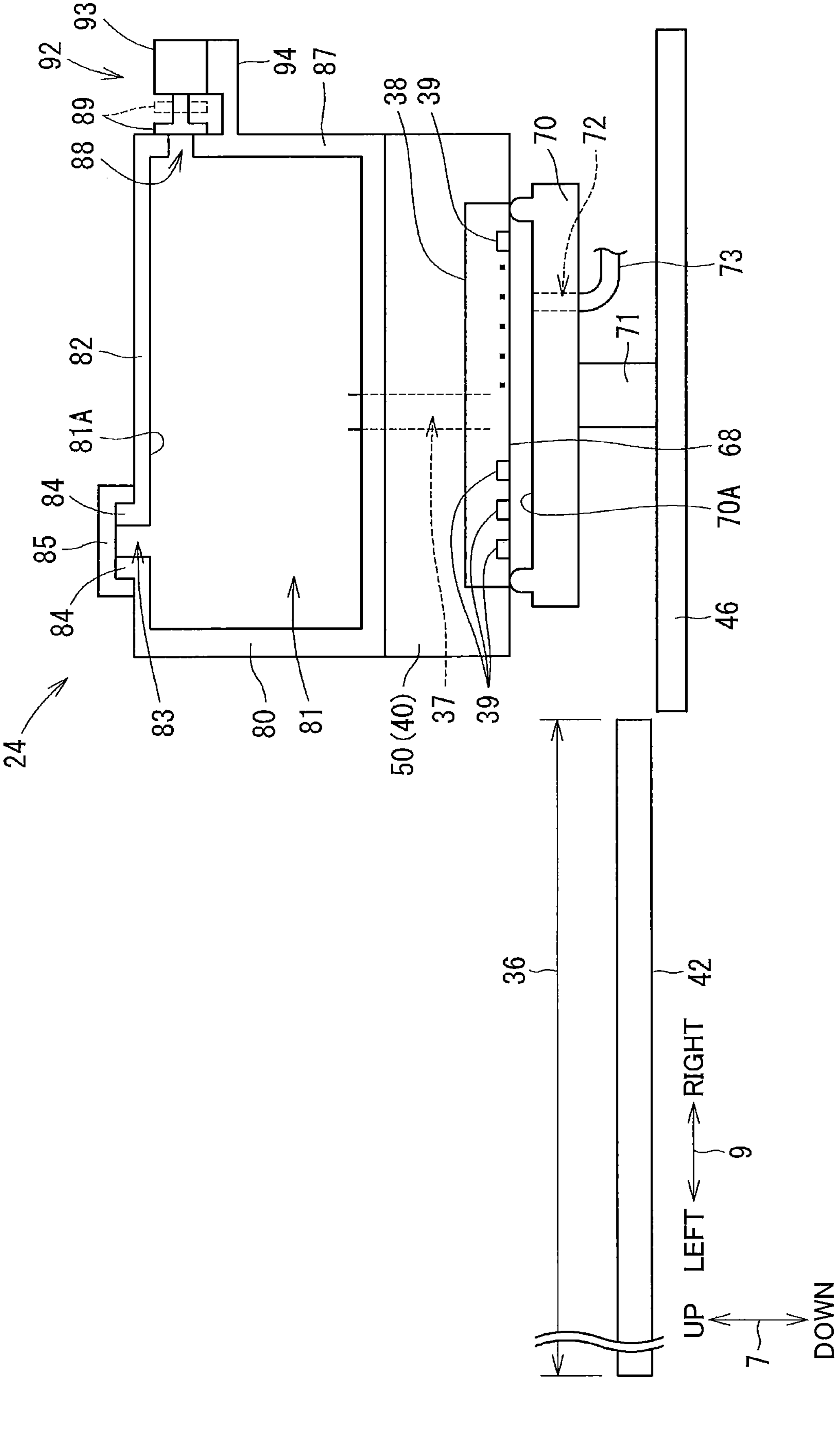
FIG. 3 is a vertical cross-sectional view of a platen 42 and a recording unit 24 taken along a plane perpendicular to a front-rear direction 8, and particularly illustrates a state where a carriage 40 is at a maintenance position and a cap 70 is at a capping position.
Figure 4:
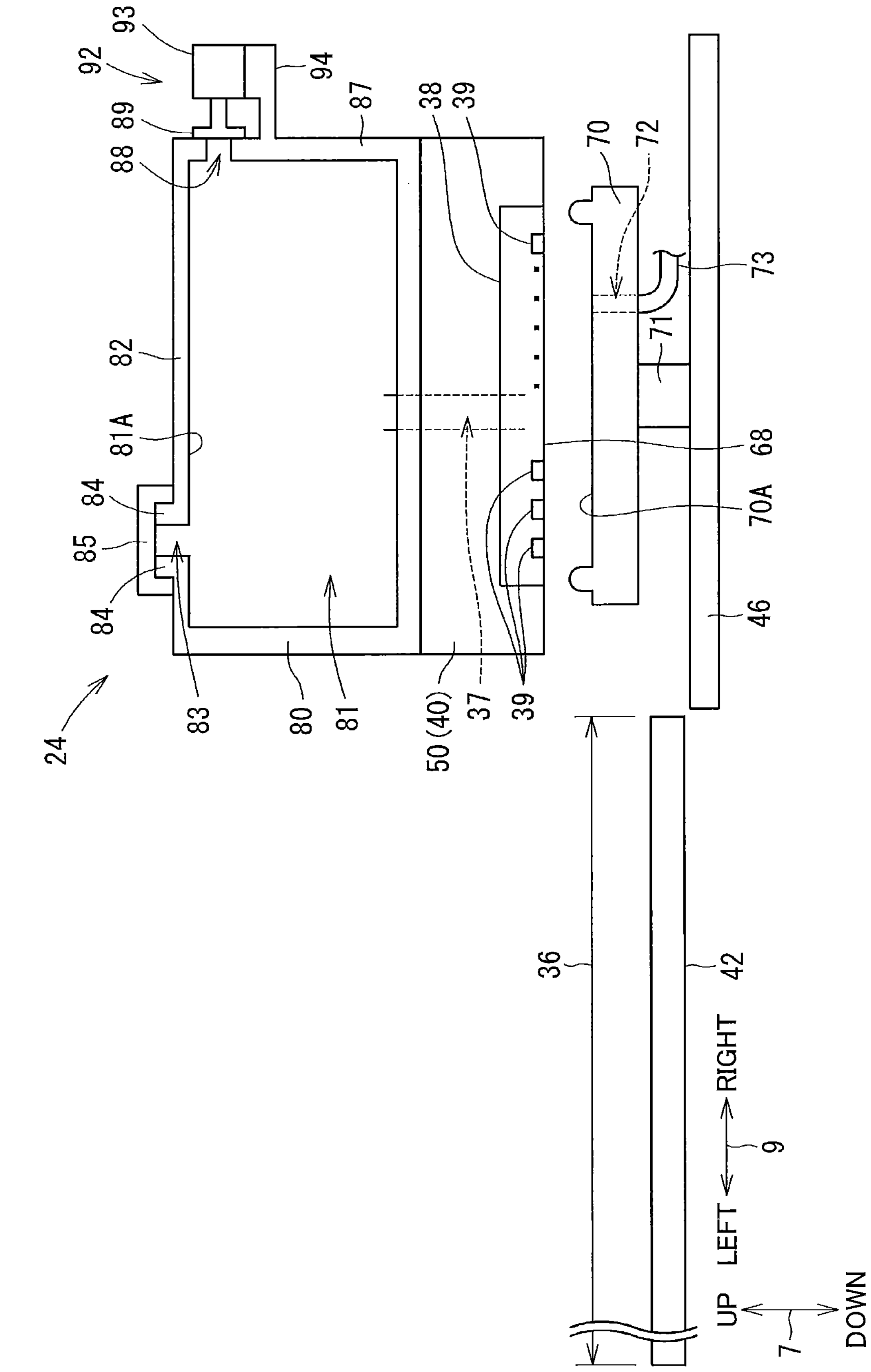
FIG. 4 is a vertical cross-sectional view of the platen 42 and the recording unit 24 taken along the plane perpendicular to the front-rear direction 8, and particularly illustrates a state where the carriage 40 is at the maintenance position and the cap 70 is at a separation position.
Figure 5:
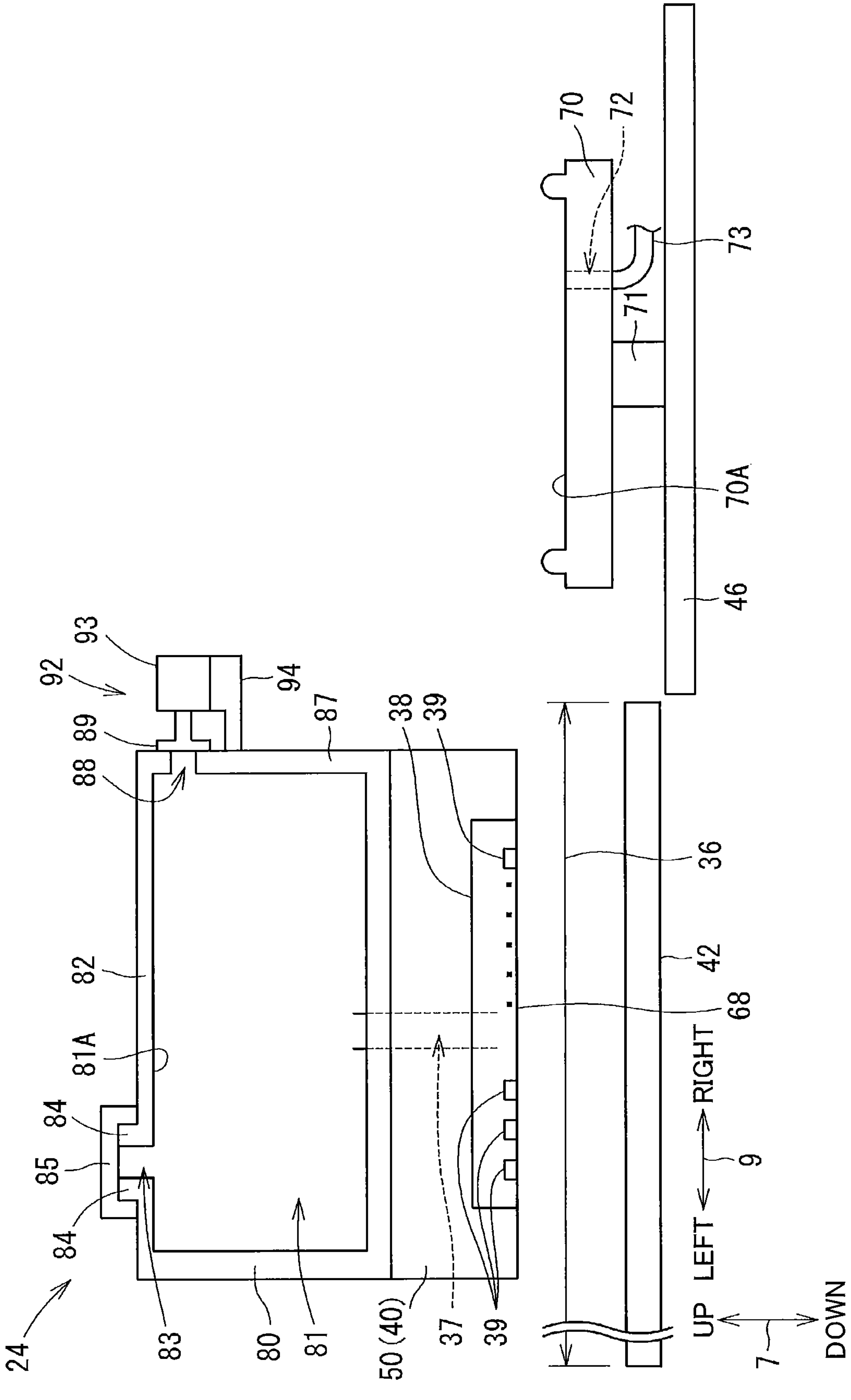
FIG. 5 is a vertical cross-sectional view of the platen 42 and the recording unit 24 taken along the plane perpendicular to the front-rear direction 8, and particularly illustrates a state where the carriage 40 is positioned above a medium passing region 36 and the cap 70 is at the separation position.

As illustrated in FIGS. 3 through 5, a medium passing region 36 is provided between the right edge and left edge of the platen 42 in the left-right direction 9. The sheet 12 conveyed along the sheet conveying passage 65 passes through the medium passing region 36.

[Recording Unit 24]

As illustrated in FIG. 2, the recording unit 24 is positioned above the platen 42 and faces the same. The recording unit 24 includes a carriage 40, a head 38, and a storage portion 80. The carriage 40 is an example of the support member.

The carriage 40 is supported by guide rails 56 and 57 so as to be movable in the left-right direction 9 perpendicular to the conveying direction 15. The left-right direction 9 is an example of the scanning direction. The guide rails 56 and 57 are positioned spaced away from each other in the front-rear direction 8 and extend in the left-right direction 9. The carriage 40 is movable between a position rightward of the medium passing region 36 and a position leftward of the medium passing region 36. Incidentally, the moving direction of the carriage 40 is not limited to the left-right direction 9, but may be a direction crossing the conveying direction 15.

The guide rail 56 is positioned upstream of the head 38 in the conveying direction 15, and the guide rail 57 is positioned downstream of the head 38 in the conveying direction 15. The guide rails 56 and 57 are supported by a pair of side frames (not illustrated) positioned outward of the linear portion 34 of the sheet conveying passage 65 in the left-right direction 9. The carriage 40 receives the drive force from a carriage drive motor 103 (see FIG. 6) to move.

The encoder 35 (see FIG. 6) includes an encoder strip and an optical sensor. The encoder strip is positioned at one of the guide rails 56 and 57. The encoder strip extends in the left-right direction 9, and has a pattern of light transmission portions and light blocking portions alternately arrayed in the left-right direction 9 with equal intervals. The optical sensor is provided at the carriage 40 at a position facing the encoder strip. The optical sensor is configured to detect the light transmission portions and the light blocking portions to generate a pulse signal. The generated pulse signal is a signal identifying the position of the carriage 40 in the left-right direction 9. The generated pulse signal is outputted to the controller 130 (FIG. 6). The pulse signal from the optical sensor of the encoder 35 is an example of the position signal and is also an example of the detection signal.

The head 38 is supported by the carriage 40. The head 38 has a lower surface 68 exposed downward and facing the platen 42. The head 38 includes a plurality of nozzles 39, an ink passage 37, and piezoelectric elements 45 (see FIG. 6).

The plurality of nozzles 39 are open at the lower surface 68 of the head 38. The head 38 connects the storage portion 80 to the plurality of nozzles 39. Each piezoelectric element 45 is configured to deform a part of the ink passage 37 to eject ink droplet downward from the corresponding nozzle 39. The piezoelectric element 45 is driven upon electric supply controlled by the controller 130.

The storage portion 80 is attached to and supported by the carriage 40. The storage portion 80 has an internal space 81 in which ink is storable. In the present embodiment, the recording unit 24 includes a single storage portion 80 in which black ink is stored. Color of ink stored in the storage portion 80 is not limiting.

The storage portion 80 is positioned above the head 38. Incidentally, in the present embodiment, the entire storage portion 80 is positioned above the head 38. However, as an alternative, a part of the storage portion 80 may be positioned above the head 38 and the remaining part of the storage portion 80 may be positioned lower than the head 38 or even with the head 38.

The internal space 81 of the storage portion 80 is in communication with the plurality of nozzles 39 through the ink passage 37. Hence, ink can be supplied from the internal space 81 to the nozzles 39.

The storage portion 80 has an upper wall 82 formed with an ink inlet 83 for injection of ink into the internal space 81. The ink inlet 83 penetrates the upper wall 82 in the thickness direction to allow the internal space 81 to be communicated with an outside of the storage portion 80.

A protruding wall 84 surrounding the ink inlet 83 protrudes upward from an upper surface of the upper wall 82. The ink inlet 83 is closed by fitting a lid 85 with the protruding wall 84. The ink inlet 83 is exposed to the outside by detaching the lid 85 from the protruding wall 84. In this state, an ink bottle (not illustrated) can be inserted into the ink inlet 83 and ink can be injected from the ink bottle into the internal space 81 through the ink inlet 83 for replenishing the storage portion 80 with ink. Incidentally, the position of the ink inlet 83 is not limiting as long as the ink inlet 83 is at a position enabling the ink inlet 83 to communicate the upper portion of the internal space 81 with the outside.

As illustrated in FIGS. 3 through 5, the storage portion 80 has a side wall 87 formed with an air communication opening 88. The air communication opening 88 is configured to provide communication between the internal space 81 of the storage portion 80 and the outside thereof. The electromagnetic valve 92 is positioned adjacent to the air communication hole 88. Well known electromagnetic valves are available as the electromagnetic valve 92. For example, the electromagnetic valve 92 includes a valve 89, and a solenoid 93 for moving the valve 89. The solenoid 93 is an example of the actuator.

The solenoid 93 is supported by a support base 94 provided at the side wall 87. The valve 89 is supported by the solenoid 93 so as to be movable in the left-right direction 9 relative to the solenoid 93. The valve 89 is moved in the left-right direction 9 relative to the solenoid 93 upon flowing electrical current through a coil in the solenoid 93.

As indicated by the solid line in FIG. 3, in a state where the valve 89 has protruded leftward relative to the solenoid 93, the valve 89 is at a closing position in which the valve 89 is in abutment with the air communication opening 88 to close the same. Further, as indicated by the broken line in FIG. 3, in a state where the protruding length of the valve 89 from the solenoid 93 is shorter than that when the valve 89 is in the closing position, the valve 89 is at an opening position in which the valve 89 is separated away from the air communication opening 88 to open the same.

[Cap 70]

As illustrated in FIGS. 3 through 5, the cap 70 is positioned outward of the platen 42 in the left-right direction 9 (rightward of the platen 42 in the present embodiment). That is, the cap 70 is positioned outward of the medium passing region 36 in the left-right direction 9. In a state where the carriage 40 is at a maintenance position (i.e., the position illustrated in FIGS. 3 and 4) rightward of the medium passing region 36, the cap 70 is positioned below the carriage 40 and faces the same (more specifically, the cap 70 faces the nozzles 39 of the head 38).

The cap 70 has a box-like shape having upper open end. The cap 70 is made of an elastic member such as rubber. The cap 70 is supported by a frame 46 through a known movable mechanism 71, and is movable in the up-down direction by the movable mechanism 71 applied with a driving force from a cap drive motor 104 (see FIG. 6). The frame 46 is positioned rightward of the platen 42, and is a plate-shaped member extending both in the front-rear direction 8 and the left-right direction 9. The movable mechanism 71 includes, for example, a ball screw or a cam.

The cap 70 is movable upward and downward between a capping position illustrated in FIG. 3 and a separation position illustrated in FIG. 4. In a state where the cap 70 is at the capping position as illustrated in FIG. 3, the upper end of the cap 70 is in pressure contact with the lower surface 68 of the head 38 from below. Hence, in this state, the plurality of nozzles 39 which open at the lower surface 68 is covered by the cap 70 from below. The separation position is positioned below the capping position. The cap 70 at its separation position is separated from the lower surface 68 of the head 38.

The cap 70 has a bottom wall formed with a through-hole 72. The through-hole 72 has one end opening at a bottom surface 70A of the cap 70, and the other end connected to one end of a tube 73. The other end of the tube 73 is connected to a waste ink tank (not illustrated) through a pump (not illustrated). The tube 73 is made of resin and has a flexibility.

In a state where the cap 70 is at the capping position and covers the nozzles 39, ink and foreign substance in the nozzles 39 are sucked by the actuation of the pump and is ejected to the cap 70. The ejected ink and foreign substance are received by the cap 70 and then sucked into the tube 73, and are discharged to the waste ink tank through the tube 73.

[Sheet Sensor 120]

As illustrated in FIG. 2, the sheet sensor 120 is positioned at the sheet conveying passage 65 and upstream of the pair of conveyer rollers 59 in the conveying direction 15. The sheet sensor 120 is configured to detect whether the sheet 12 is present at the disposed position of the sheet sensor 120 (i.e., at the position at which the sheet sensor 120 is disposed). Incidentally, known sheet sensors are available as the sheet sensor 120. In the present embodiment, the sheet sensor 120 includes, for example, a shaft 121, a detection probe 122 pivotally movable about the axis of the shaft 121, and an optical sensor 123 including a light emitting element and a light receiving element configured to receive light emitted from the light emitting element. The sheet sensor 120 is an example of the medium sensor.

The detection probe 122 has one end portion protruding to the sheet conveying passage 65. The other end portion of the detection probe 122 is configured to advance into and retract from an optical path extending from the light emitting element to the light receiving element.

In a state where no external force is applied to the one end portion of the detection probe 122, the other end portion of the detection probe 120 is positioned in the optical path and blocks light emitted from the light emitting element, as indicated by the solid line in FIG. 2. At this time, a low-level signal is outputted from the optical sensor 123 to the controller 130. The low-level signal from the optical sensor 123 of the sheet sensor 120 is an example of the medium absence signal and is also an example of the detection signal.

When the one end portion of the detection probe 122 is pushed by the leading end of the sheet 12 during conveyance thereof, the detection probe 122 pivotally moves and the other end portion of the detection probe 122 retracts from the optical path (as indicated by the broken line in FIG. 2), thereby allowing the light to reach the light receiving element. At this time, a high-level signal is outputted from the optical sensor 123 to the controller 130. Incidentally, the detection probe 122 is urged to the position indicated by the solid line by a spring and the like. The high-level signal from the optical sensor 123 of the sheet sensor 120 is an example of the medium presence signal and is also an example of the detection signal.

The sheet sensor 120 may be positioned at the sheet conveying passage 65 and downstream of the pair of discharge rollers 44 in the conveying direction 15. Alternatively, two sheet sensors 120 may be provided on the sheet conveying passage 65: one positioned upstream of the pair of conveyer rollers 59 in the conveying direction 15, and the other downstream of the pair of discharge rollers 44 in the conveying direction 15.

[Rotary Encoder 75]

The rotary encoder 75 (FIG. 6) includes an encoder disc provided at the shaft of the conveyer motor 101 (FIG. 6) and rotatable together with the shaft, and an optical sensor. The encoder disc is formed with a pattern of light transmission portions and light blocking portions alternately arrayed in a circumferential direction of the encoder disc with equal intervals. When the encoder disc rotates, the optical sensor detects the light transmission portions and light blocking portions to generate a pulse signal. The generated pulse signal is outputted to the controller 130 from the optical sensor of the rotary encoder 75. The controller 130 calculates rotation amount of the conveyer motor 101 on the basis of the outputted pulse signal. Incidentally, in addition to the rotary encoder 75 for the conveyer motor 101, other rotary encoders may be provided for the sheet supply motor 102 and the conveyer roller 60, for example. The pulse signal from the optical sensor of the rotary encoder 75 is an example of the detection signal.

[Controller 130 and Memory 140]

Details of the controller 130 and the memory 140 will next be described with reference to FIG. 6. Particular features in the present disclosure are attained by the controller 130 performing processes in accordance with flowcharts described later. The controller 130 is configured to control overall operation of the multifunction peripheral 10. The controller 130 includes CPU 131 and ASIC 135. The memory 140 includes a ROM 132, a RAM 133, and an EEPROM 134. The CPU 131, the ASIC 135, the ROM 132, the RAM 133 and the EEPROM 134 are connected to each other via an internal bus 137.

The ROM 132 stores therein programs which the CPU 131 executes to control various operations. The RAM 133 is used as a memory region to temporarily store data and signals used when the CPU 131 is executing the programs, or a working region for data processing. The EEPROM 134 stores settings and flags, etc. to be held after power off.

The ASIC 135 is connected to the conveyer motor 101, the sheet supply motor 102, the carriage drive motor 103, and the cap drive motor 104. Driver circuits for controlling the corresponding motors are incorporated in the ASIC 135. The CPU 131 is configured to output drive signals for rotating the motors to the corresponding driver circuit. Each driver circuit is configured to output driving current based on the drive signal acquired from the CPU 131 to the corresponding motor to thereby rotate the same.

That is, the controller 130 controls the sheet supply motor 102 to control the sheet feeding unit 16 to feed the sheet 12. The controller 130 controls the conveyer motor 101 to control the pair of conveyer rollers 59 and the pair of discharge rollers 44 to convey the sheet 12. The controller 130 controls the carriage drive motor 103 to move the carriage 40. Further, the controller 130 controls the cap drive motor 104 to drive the movable mechanism 71 to move the cap 70.

The ASIC 135 is connected also to the installation sensor 30. In a case where the controller 130 acquires the high-level signal from the installation sensor 30, the controller 130 determines (detects) that the multifunction peripheral 10 is installed on an installation surface such as the upper surface of a desk. On the other hand, in a case where the controller 130 acquires the low-level signal from the installation sensor 30, the controller 130 determines (detects) that the multifunction peripheral 10 is not installed on the installation surface, such as a state where the multifunction peripheral 10 is lifted from the installation surface.

Further, the ASIC 135 is connected to the tray sensor 110. In a case where the controller 130 acquires the low-level signal from the tray sensor 110, the controller 130 determines (detects) that the sheet tray 20 is at the sheet supply position. On the other hand, in a case where the controller 130 acquires the high-level signal from the tray sensor 110, the controller 130 determines (detects) that the sheet tray 20 is not at the sheet supply position.

Further, the ASIC 135 is connected to the cover sensor 150. In a case where the controller 130 acquires the low-level signal from the cover sensor 150, the controller 130 determines (detects) that the movable cover 145 is at the closed position. On the other hand, in a case where the controller 130 acquires the high-level signal from the cover sensor 150, the controller 130 determines (detects) that the movable cover 145 is at the open position.

Further, the ASIC 135 is connected to the sheet sensor 120. In a case where the controller 130 acquires the high-level signal from the sheet sensor 120, the controller 130 determines (detects) that the sheet 12 is present at the disposed position of the sheet sensor 120. On the other hand, in a case where the controller 130 acquires the low-level signal from the sheet sensor 120, the controller 130 determines (detects) that the sheet 12 is not present at the disposed position of the sheet sensor 120.

Further, the ASIC 135 is connected to the optical sensor of the rotary encoder 75. The controller 130 calculates rotation amount of the conveyer motor 101 on the basis of the pulse signal (electric signal) received from the optical sensor of the rotary encoder 75.

The controller 130 calculates (identifies) the position of the sheet 12 on the basis of the rotation amount of the conveyer motor 101 counted from a timing at which the pulse signal received from the sheet sensor 120 is changed from the low-level signal to the high-level signal (i.e., from a timing of detecting arrival of the leading end of the sheet 12 at the disposed position of the sheet sensor 120).

Further, the ASIC 135 is connected to the encoder 35. On the basis of the pulse signal (an electric signal) received from the encoder 35, the controller 130 identifies the position of the carriage 40 and determines whether or not the carriage 40 is moving.

Further, the ASIC 135 is connected to the piezoelectric elements 45. The piezoelectric elements 45 are driven by being supplied with electric power through a driver circuit (not illustrated) under control by the controller 130. The controller 130 controls supply of electric power to the piezoelectric elements 45 to cause the nozzles 39 to eject ink droplets. More specifically, the controller 130 supplies electric power to one or more of the piezoelectric elements 45 corresponding to selected one or more of the plurality of nozzles 39 to thereby cause the selected one or more nozzles to eject ink droplets.

Further, the ASIC 135 is connected to the solenoid 93. The controller 130 controls supply of electrical current to the coil of the solenoid 93 to move the valve 89.

The controller 130 alternately performs a conveying process and a printing process for recording an image on the sheet 12. The conveying process is a process in which the pair of conveyer rollers 59 and the pair of discharge rollers 44 are controlled to convey the sheet 12 by a predetermined amount of line feed. The controller 130 controls, by controlling the conveyer motor 101, the pair of conveyer rollers 59 and the pair of discharge rollers 44 to perform the conveying process.

The printing process is a process in which the controller 130 controls, while moving the carriage 40 in the left-right direction 9, supply of electric power to the piezoelectric elements 45 to cause the head 38 to eject ink droplets from the nozzles 39. During the printing process, the carriage 40 is positioned within the medium passing region 36 and faces the platen 42, as illustrated in FIG. 5.

The controller 130 temporarily stops conveyance of the sheet 12 for a predetermined time period between a preceding conveying process and a subsequent conveying process. The printing process is performed during the time period for stopping the sheet 12. That is, in the printing process, the controller 130 performs a single pass operation in which ink droplets are ejected from the nozzles 39 while moving the carriage 40 rightward or leftward. Hence, image recordation for one pass operation is performed on the sheet 12.

The controller 130 repeatedly and alternately performs the conveying process and the printing process, so that image recordation is performed on the entire image recordable region of the sheet 12. That is, the controller 130 performs the pass operation a plurality of times to record an image on the sheet 12.

Incidentally, the controller 130 is not limited to the above-described configuration. For example, the controller 130 may have a configuration in which only the CPU 131 performs various processes, a configuration in which only the ASIC 135 performs the various processes, or a configuration in which the CPU 131 and the ASIC 135 perform the various processes in cooperation with each other. Further, the controller 130 may have a configuration in which a single CPU 131 solely performs processes, or a configuration in which a plurality of CPUs 131 shares the processes. Alternatively, the controller 130 may have a configuration in which a single ASIC 135 solely performs processes, or a configuration in which a plurality of ASICs 135 shares the processes.

[Control of Opening/Closing of Valve 89 by Controller 130]

In the printer portion 11 constructed as described above, the controller 130 performs opening/closing control to the valve 89. Opening/closing control to the valve 89 will be described with reference to flowcharts illustrated in FIGS. 7 and 8.

The valve 89 is at the opening position indicated by the broken line in FIG. 3 in a case where the multifunction peripheral 10 has no abnormality. In a state where the valve 89 is at the opening position, the internal space 81 is communicated with the atmosphere and thus the pressure in the internal space 81 is equal to the atmospheric pressure.

Figure 7:
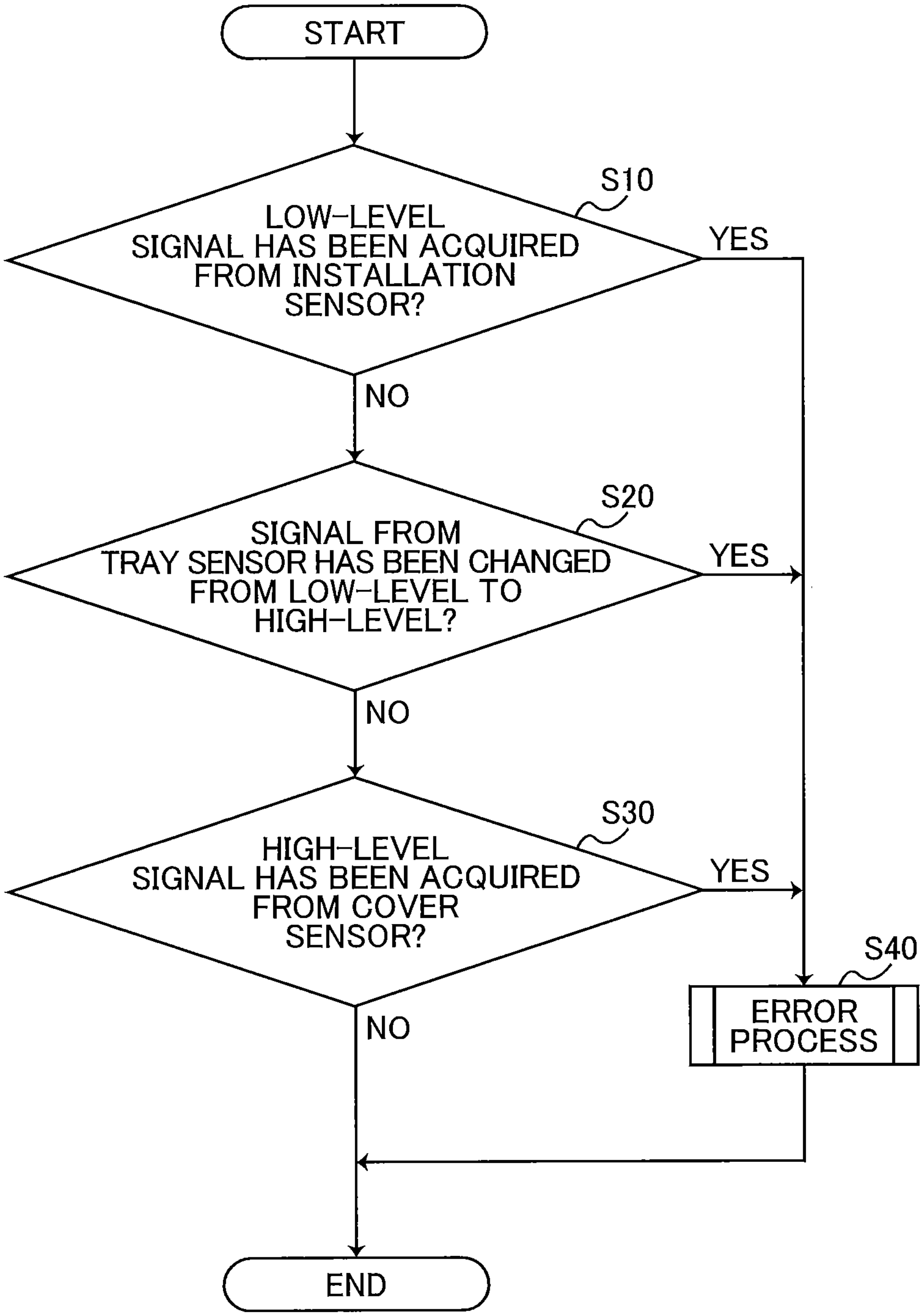
FIG. 7 is a flowchart illustrating control of opening and closing of a valve 89.

As illustrated in FIG. 7, the controller 130 repeatedly performs the process of steps S10 to S30 at predetermined time intervals (for example, several milliseconds). That is, the controller 130 references the signal acquired from the installation sensor 30 (S10), references the signal acquired from the tray sensor 110 (S20), and references the signal acquired from the cover sensor 150 (S30). Incidentally, steps S10 to S30 may be performed in any order, or these steps may be performed in parallel.

In a case where the controller 130 acquires the high-level signal from the installation sensor 30 (S10: No), the controller 130 determines that the multifunction peripheral 10 is in a normal state since the multifunction peripheral 10 is installed on the installation surface such as the upper surface of a desk. On the other hand, in a case where the controller 130 acquires the low-level signal from the installation sensor 30 (S10: Yes), the controller 130 determines that the multifunction peripheral 10 is in an abnormal state. This is because, in this case, the multifunction peripheral 10 is not installed on the installation surface (for example, the multifunction peripheral 10 has been lifted up from the installation surface). When determining in S10 that the multifunction peripheral 10 is in an abnormal state, in S40 the controller 130 performs an error process, i.e., a process to be performed at the time of abnormality (described later).

In a case where the controller 130 acquires the low-level signal from the tray sensor 110 (S20: No), the controller 130 determines that the multifunction peripheral 10 is in a normal state because the sheet tray 20 is positioned at the sheet supply position in the housing 14. On the other hand, in a case where the controller 130 acquires the high-level signal from the tray sensor 110 (S20: Yes), that is, in a case where the signal acquired from the tray sensor 110 is changed from the low-level signal to the high-level signal, the controller 130 determines that the multifunction peripheral 10 is in an abnormal state. This is because, in this case, the sheet tray 20 has been pulled out of the housing 14. In the latter case, the error process is performed (S40).

In a case where the controller 130 acquires the low-level signal from the cover sensor 150 (S30: No), the controller 130 determines that the multifunction peripheral 10 is in a normal state since the movable cover 145 is at the closed position. On the other hand, in a case where the controller 130 acquires the high-level signal from the cover sensor 150 (S30: Yes), the controller 130 determines that the multifunction peripheral 10 is in an abnormal state. This is because, in this case, the movable cover 145 is at the open position. In the latter case, the error process is performed (S40). In this way, in the process of steps S10 to S30, the controller 130 determines whether the multifunction peripheral 10 has an abnormality on the basis of the acquired signals.

The error process will be described with reference to FIG. 8. The controller 130 energizes (i.e., passes electrical current through) the coil in the solenoid 93 to move the valve 89 from the opening position to the closing position (S110). That is, in a case where the controller 130 determines on the basis of the acquired signals that the multifunction peripheral 10 is in an abnormal state (i.e., that the multifunction has an abnormality), the controller 130 controls the solenoid 93 to move the valve 89 to the closing position. The internal space 81 of the storage portion 80 is shut off from the atmosphere (i.e., enters a sealed state) upon movement of the valve 89 to the closing position.

Then, the controller 130 determines whether the abnormality in the multifunction peripheral 10 is eliminated (S120). For example, in a case where the multifunction peripheral 10 is determined to be in an abnormal state in step S10, the controller 130 determines that the abnormality is eliminated (S120: Yes) in response to acquiring the high-level signal from the installation sensor 30. This is because, in this case, the high-level signal from the installation sensor 30 means that the multifunction peripheral 10 has been installed again on the installation surface. Further, for example, in a case where the multifunction peripheral 10 is determined to be in an abnormal state in step S20, the controller 130 determines that the abnormality is eliminated (S120: Yes) in response to acquiring the low-level signal from the tray sensor 110. This is because, in this case, the low-level signal from the tray sensor 110 means that the sheet tray 20 has been inserted again to the housing 14 (i.e., means that the sheet tray 20 has returned back to the sheet supply position). Further, for example, in a case where the multifunction peripheral 10 is in an abnormal state in step S30, the controller 130 determines that the abnormality is eliminated (S120: Yes) in response to acquiring the low-level signal from the cover sensor 150. This is because, in this case, the low-level signal from the cover sensor 150 means that the movable cover 145 has been closed again (i.e., means that the movable cover 145 has returned back to the closed position).

After the elimination of the abnormality, the controller 130 determines whether the carriage 40 is at the maintenance position (S130). In a case where the carriage 40 is not at the maintenance position (S130: No), the controller 130 moves the carriage 40 to the maintenance position (S140). Then, the controller 130 drives the cap drive motor 104 to move the cap 70 to the capping position (S150).

On the other hand, in a case where the carriage 40 is at the maintenance position (S130: Yes), the controller 130 determines whether the cap 70 is at the capping position (S160). This determination is made on the basis of a signal inputted from a cap sensor (not illustrated). In a case where the cap 70 is not at the capping position (S160: No), the controller 130 drives the cap drive motor 104 to move the cap 70 to the capping position (S150).

In a state where the carriage 40 is at the maintenance position and the cap 70 is at the capping position, (S150, S160: Yes), the controller 130 moves the valve 89 from the closing position to the opening position (S170), whereupon the error process is terminated.

As described above, in a case where the controller 130 determines that the abnormality in the multifunction peripheral 10 is eliminated (S120: Yes) on the basis of the signals acquired after determining that the multifunction peripheral 10 is in the abnormal state, the controller 130 controls the solenoid 93 to move the valve 89 to the opening position (S170). Further, in a case where the controller 130 determines that the abnormality in the multifunction peripheral 10 is eliminated (S120: Yes), the controller 130 moves the cap 70 to the capping position to cover the nozzles 39 (S150), and controls, after the cap 70 covers the nozzles 39, the solenoid 93 to move the valve 89 to the opening position (S170).

[Control of Image Recordation by Controller 130]

In the printer portion 11 constructed as described above, the controller 130 performs sequential image recordation control in which the sheet 12 is conveyed and image is recorded on the conveyed sheet 12. Control of the image recordation by the controller 130 will next be described with reference to the flowcharts illustrated in FIGS. 9 and 10. Further, the controller 130 performs the above-described error process (FIG. 8) in a case where an abnormality occurs in the multifunction peripheral 10 during control of the image recordation. The error process during the control to the image recordation will also be described.

Figure 9:
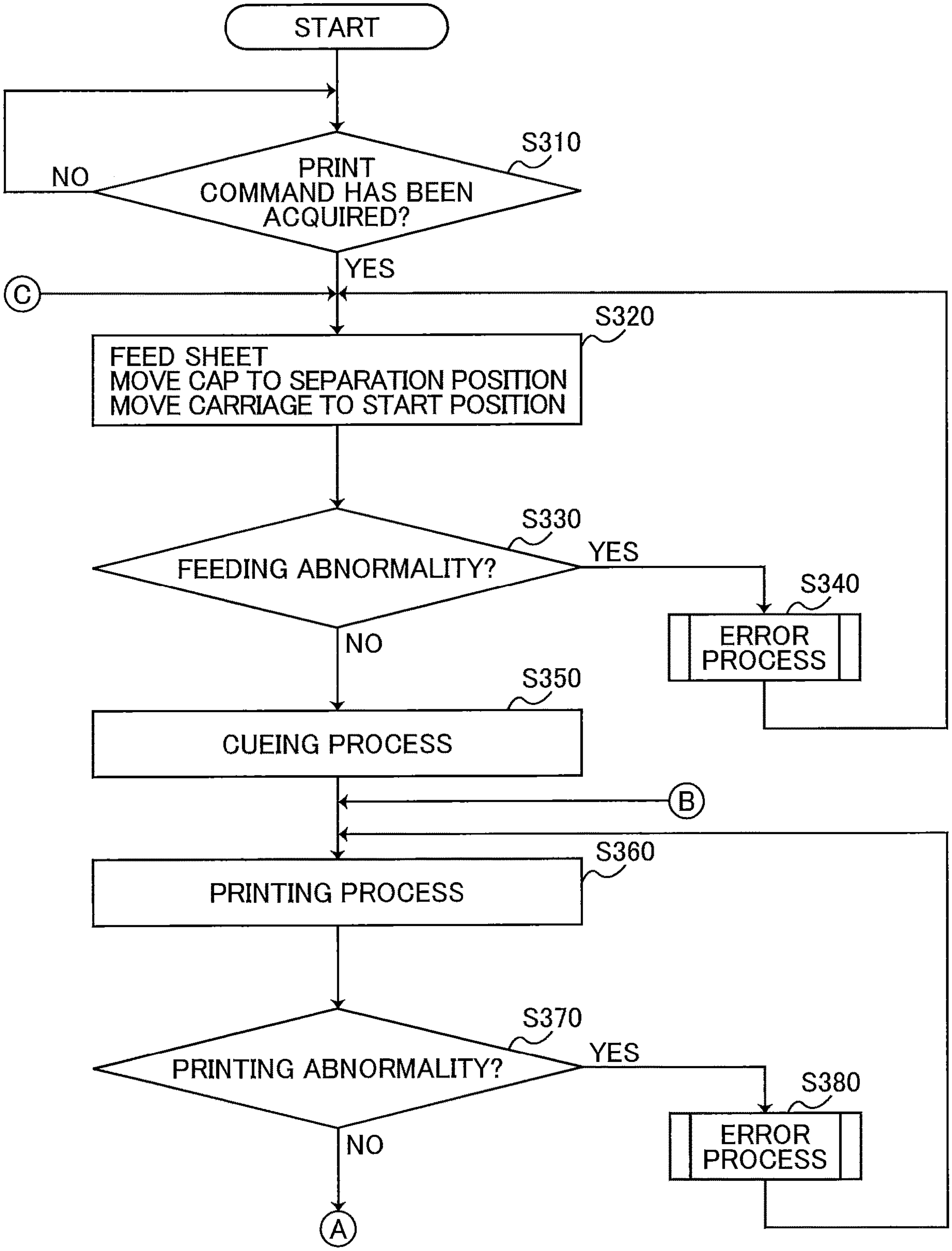
FIG. 9 is part of a flowchart illustrating image recording control in the multifunction peripheral 10.
Figure 10:
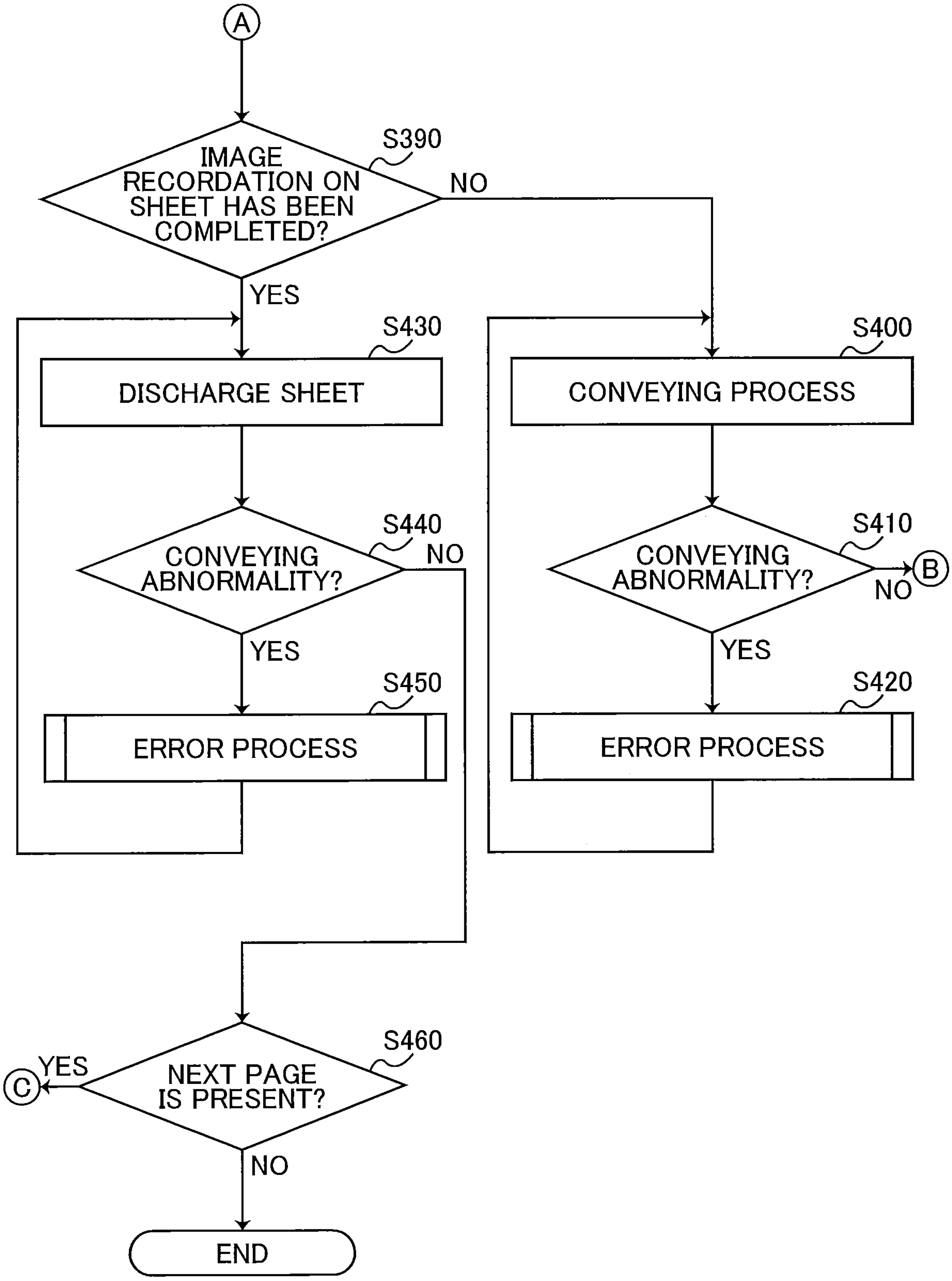
FIG. 10 is the remaining part of the flowchart illustrating the image recordation control in the multifunction peripheral 10.

The control illustrated in FIG. 7 is repeatedly performed at prescribed time intervals during execution of the image recordation control illustrated in FIGS. 9 and 10. In this case, the image recordation control may be interrupted at the time of executing the error process (S40) illustrated in FIG. 7. Alternatively, the image recordation control may be continued at the time of executing the error process (S40) illustrated in FIG. 7.

In a case where the image recordation control is not performed, the recording unit 24 and the cap 70 are at the positions illustrated in FIG. 3. Specifically, the carriage 40 is at the maintenance position, and the cap 70 is at the capping position. Further, in a state where the multifunction peripheral 10 has no abnormality, the valve 89 is at the opening position indicated by the broken line in FIG. 3.

Print command is transmitted to the controller 130 from the operating portion 17 (see, FIG. 1) of the multifunction peripheral 10 or from an external device connected to the multifunction peripheral 10. The print command contains a command to start image recordation control, information on the size of the sheet 12, and print data for an image to be recorded on the sheet 12.

When acquiring print command (S310: Yes), the controller 130 starts feeding the sheet 12 (S320) supported on the sheet tray 20.

In step S320, the controller 130 starts driving the sheet supply motor 102, whereby the sheet feeding roller 25 feeds the sheet 12 supported on the sheet tray 20 to the sheet conveying passage 65. Further, the controller 130 drives the conveyer motor 101, whereby the pair of conveyer rollers 59 conveys the sheet 12 in the conveying direction 15 when the leading end (the downstream end in the conveying direction 15) of the sheet 12 fed to the sheet conveying passage 65 by the sheet feeding roller 25 arrives at the pair of conveyer rollers 59.

Further, in step S320, the controller 130 drives the cap drive motor 104, whereby the movable mechanism 71 is actuated to move the cap 70 from the capping position to the separation position. That is, the cap 70 is moved away from the head 38. Next, the controller 130 drives the carriage drive motor 103 to move the carriage 40 from the maintenance position to a print-start position. The print-start position is a position from which the carriage 40 starts to move at the time of execution of the printing process (S360). The print-start position is determined on the basis of the print data.

In step S320, the feeding of the sheet 12, and the moving of the cap 70, and the moving of the carriage 40 are performed in parallel.

The controller 130 determines whether a feeding abnormality (a sheet supply abnormality) has occurred (i.e., whether the multifunction peripheral 10 has a feeding abnormality) (S330). For example, the controller 130 counts an elapsed time period from a timing of staring driving the sheet supply motor 102 in S320. In a case where the high-level signal is not acquired by the controller 130 from the sheet sensor 120 within a preset prescribed time period from the start timing of driving the sheet supply motor 102, the controller 130 determines that the multifunction peripheral 10 is in an abnormal state (the multifunction peripheral 10 has a feeding abnormality) (S330: Yes). This is because, in this case, one of the following feeding abnormalities is more likely to have occurred: feeding abnormality A (the sheet 12 has not been supplied from the sheet tray 20), feeding abnormality B (there is no sheet 12 on the sheet tray 20), and feeding abnormality C (the sheet 12 supplied from the sheet tray 20 is jammed at the curved portion 33). Then, the above-described error process is performed (S340, FIG. 8).

Figure 8:
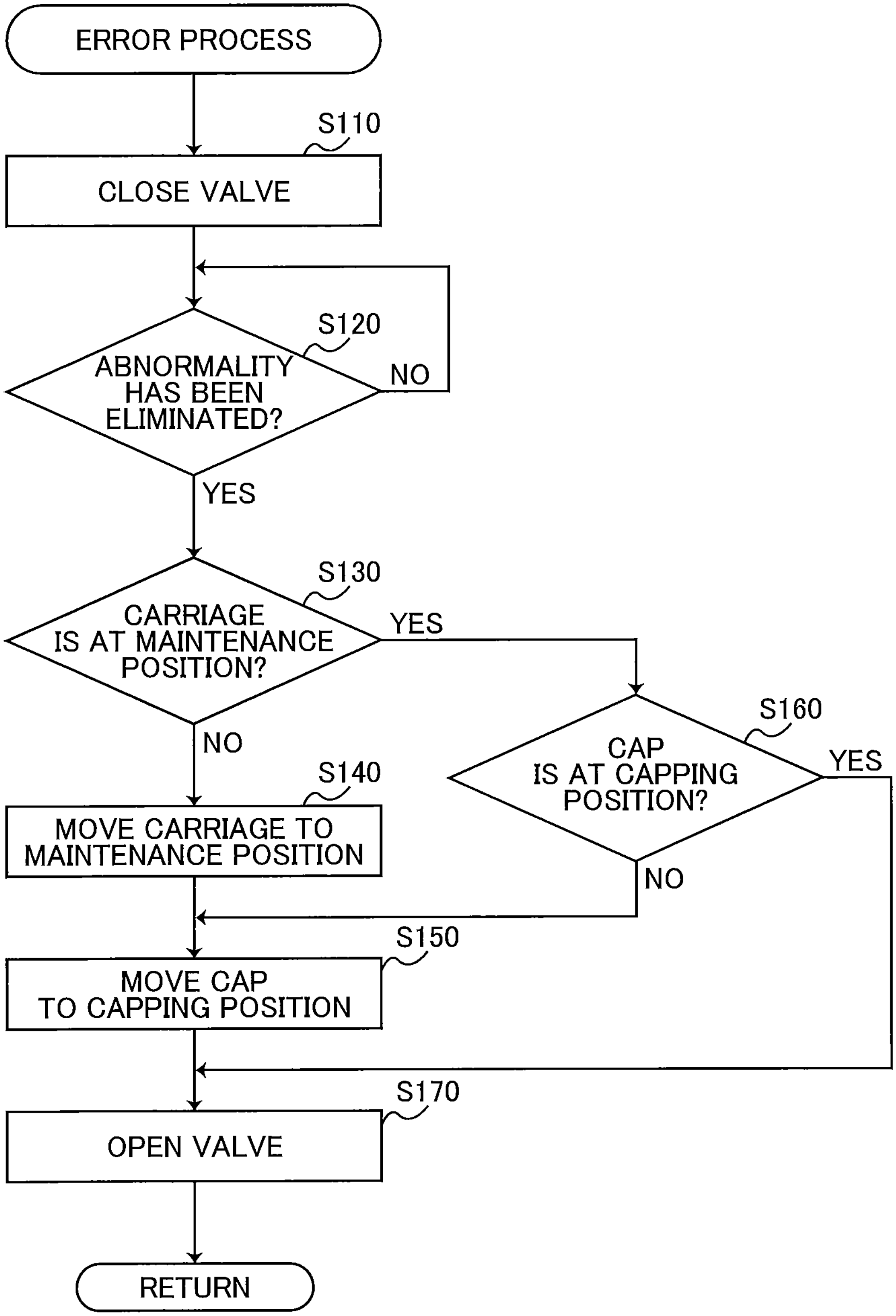
FIG. 8 is a flowchart illustrating an error process performed in the multifunction peripheral 10.

The error process in step S340 is performed on the basis of the flowchart illustrated in FIG. 8. At this time, in step S120, when acquiring the high-level signal from the tray sensor 110 and then acquiring the low-level signal therefrom, the controller 130 determines that the feeding abnormality A or B is eliminated. This is because, in this case, change from the high-level signal to the low-level signal in the signal acquired from the tray sensor 110 is likely to denote that the sheet tray 20 is detached from the housing 14, replenishment of sheets is performed, and then the sheet tray 20 is again inserted to the housing 14. Further, in step S120, when acquiring the high-level signal from the cover sensor 150 and then acquiring the low-level signal therefrom, the controller 130 determines that feeding abnormality C is eliminated. This is because, in this case, change from the high-level signal to the low-level signal in the signal acquired from the tray cover sensor 150 is likely to mean that the movable cover 145 is opened, jammed sheet 12 is removed, and then the movable cover 145 is closed again. When determining that the abnormality is eliminated, the controller 130 resumes the feeding of the sheet (S320).

Incidentally, in the step S120, the controller 130 may determine that the abnormality has been eliminated in a case where the controller 130 acquires an input signal from the operating portion 17 in addition to the above-described change in the acquired signal. Specifically, in this case, when a feeding abnormality has occurred, the controller 130 displays, on the touch panel of the operating portion 17, both a notification that a feeding abnormality has occurred and a button to be pressed by the user after the user eliminates the feeding abnormality. When the user presses the button after the user replenishes new sheets 12 or removes a jammed sheet 12, i.e., when the operating portion 17 receives from the outside an input signal indicative of completion of replenishment of the sheets 12 or completion of removal of the jammed sheet 12, the operating portion 17 transmits the input signal to the controller 130. When the controller 130 acquires the input signal in addition to detection of change in the signal acquired from the tray sensor 110 or the cover sensor 150, the controller 130 determines that the abnormality has been eliminated.

Further, a sheet sensor used for detecting (determining) the feeding abnormality B (no sheet 12 is present on the sheet tray 20) may be provided on the sheet tray 20. For example, the sheet sensor is positioned on the upper surface of the bottom plate 22 of the sheet tray 20 and is configured to output detection signals differing depending on presence or absence of the sheet 12 on the upper surface (i.e., output a detection signal indicating presence or absence of the sheet 12 on the upper surface).

In a case where no feeding abnormality occurs (S330: No), the controller 130 performs a cueing process (S350). In the cueing, the controller 130 stops the sheet 12 that is being conveyed in the conveying direction 15 at an image recordation start position. The image recording start position is a position where the leading end (downstream end) of the image forming region of the sheet 12 in the conveying direction 15 faces the nozzle(s) 39 positioned at most downstream in the conveying direction 15 of the plurality of nozzles 39.

Next, the controller 130 performs the printing process (S360). The controller 130 performs a pass operation once. That is, the controller 130 controls the nozzles 39 to eject ink droplets while moving the carriage 40 from the print start position. Incidentally, in S320, the carriage 40 which starts moving from the maintenance position may continue moving for the printing process without stopping at the print start position. Alternatively, the carriage 40 may temporarily stop at the print start position.

During the printing process, the controller 130 maintains the valve 89 at the opening position as long as an abnormality does not occur. That is, as long as the head 39 is ejecting ink droplets from the nozzles 39 toward the sheet 12 and the controller 130 is determining that the multifunction peripheral 10 is in the normal state (i.e., the multifunction peripheral 10 has no abnormality) on the basis of the acquired signals, the controller 130 controls the solenoid 93 to maintain the valve 89 at the opening position.

Then, the controller 130 determines whether a printing abnormality has occurred (i.e., whether the multifunction peripheral 10 has a printing abnormality) (S370). For example, the controller 130 determines, on the basis of the signals acquired from the sheet sensor 120, the rotary encoder 75 and the encoder 35, that an abnormality occurs such as sheet jamming at the linear portion 34 or an immovable state of the carriage 40 due to the sheet 12 catching the carriage 40 (S370: Yes). For example, in a case where the pulse signal is not acquired from the encoder 35, the controller 130 determines that an abnormality occurs that the carriage 40 is incapable of moving. In this case, the above-described error process is performed (S380, FIG. 8).

The error process in the step S380 is also performed on the basis of the flowchart illustrated in FIG. 8. In step S120 of this error process, the controller 130 determines that the abnormality is eliminated in response to again acquiring the low-level signal from the cover sensor 150 after acquiring the high-level signal therefrom. This is because, in this case, it is likely that the movable cover 145 has been once opened, the sheet 12 jammed at the linear portion 34 has been removed and then the movable cover 145 has been closed again. The controller 130 resumes the printing process (S360) when determining that the abnormality is eliminated. Incidentally, the controller 130 may determine that the abnormality is eliminated in a case where the input signal is acquired from the operating portion 17 as in the process in case of occurrence of the feeding abnormality.

In a case where no printing abnormality occurs (S370: No), the controller 130 determines whether image recordation to the present sheet 12 is completed on the basis of the information on the size of the sheet and print data those contained in the print command is terminated (S390).

In a case where the image recordation on the present sheet 12 is not completed (S390: No), a sheet conveying process is performed (S400). In the sheet conveying process, the controller 130 drives the conveyer motor 101 to cause the pair of conveyer rollers 59 and the pair of discharge rollers 44 to convey the sheet 12 by a predetermined line feed amount.

The controller 130 determines whether a conveying abnormality has occurred (i.e., whether the multifunction peripheral 10 has a conveying abnormality) (S410). For example, on the basis of the signals transmitted from the sheet sensor 120 and the rotary encoder 75, the controller 130 determines that an abnormality occurs such as jamming of the sheet 12 at the curved portion 33 or the linear portion 34 (S410: Yes). In this case, the above-described error process is performed (S420, FIG. 8).

The error process in step S420 is also performed on the basis of the flowchart illustrated in FIG. 8. In step S120 in this error process, the controller 130 determines that the abnormality is eliminated in response to again acquiring the low-level signal from the cover sensor 150 after acquiring the high-level signal therefrom. This is because, in this case, it is likely that the movable cover 145 has been opened once, the sheet 12 jammed at the curved portion 33 or the linear portion 34 has been removed and then the movable cover 145 has been closed again. The controller 130 resumes the conveying process (S400) when determining that the abnormality is eliminated. Incidentally, the controller 130 may determine that the abnormality is eliminated in a case where that the input signal is acquired from the operating portion 17 as in the processes in case of occurrence of the feeding abnormality and the printing abnormality.

In a case where the image recordation on the present sheet 12 is completed (S390: Yes), the controller 130 controls the pair of conveyer rollers 59 and the pair of discharge rollers 44 to convey the sheet 12 in the conveying direction 15 and to discharge the sheet 12 onto the discharge tray 21 (S430). In this case, as in steps S410 and S420, the controller 130 determines whether the multifunction peripheral 10 has a conveying abnormality (S440) and performs the error process in case of occurrence of a conveying abnormality (S450, FIG. 8).

Then, the controller 130 determines whether there is image data left to be recorded on the sheet 12 in the image data contained in the print command (i.e., whether image data that has not yet been recorded on the sheet 12 is left in the image data contained in the print command). That is, the controller 130 determines whether there is image recordation for the next page (S460).

In a case where the image recordation for the next page is required (S460: Yes), the controller 130 feeds a subsequent sheet 12 from the sheet tray 20 to the sheet conveying passage 65 (S320). Incidentally, the feeding of the subsequent sheet 12 (S320) may be performed in parallel to the discharge of the preceding sheet 12 (S430).

In a case where no there is no image recordation for the next page (S460: No), the controller 130 terminates the series of image recordation control.

Effect and Technical Advantages of the Embodiment

According to the embodiment, the valve 89 is moved to the closing position when an abnormality such as jamming of the sheet 12 occurs in the multifunction peripheral 10. Hence, even in a case where the sheet 12 is brought into contact with the nozzles 39 and thus ink permeates the sheet 12 from the nozzles 39, the inner pressure of the storage portion 80 is lowered (negative pressure level in the storage portion 80 rises) as the permeation of the ink advances. Thus, further permeation of the ink can be stopped.

Further, according to the present embodiment, the valve 89 is at the opening position during image recordation on the sheet 12 as long as the multifunction peripheral 10 is in the normal state. Therefore, during the image recordation, an operation to open the valve 89 for the purpose of preventing the inner pressure of the storage portion 80 from lowering is unnecessary. Hence, speed of image recordation on the sheet 12 can be suppressed from becoming slow.

Further, according to the present embodiment, the valve 89 is moved to the opening position after an abnormality is eliminated. Therefore, ink leakage caused by moving the valve 89 to the opening position during the abnormal state of the multifunction peripheral 10 can be prevented.

Further, according to the present embodiment, the valve 89 is moved to the opening position after the cap 70 covers the nozzles 39. Therefore, even if ink is leaked from the nozzle 39 by shifting the valve 89 to the opening position, the cap 70 can receive the leaked ink. Hence, adhesion of ink to other components in the multifunction peripheral 10 can be prevented.

Further, according to the present embodiment, the controller 130 can determine whether an abnormality occurs in the sheet 12 on the basis of presence or absence of the high-level signal and the low-level signal from the sheet sensor 120 and the timing of output of the signals.

Further, according to the present embodiment, the controller 130 can determine whether the carriage 40 is normally moving on the basis of the presence or absence of the pulse signal outputted from the encoder 35.

Further, in a case where the sheet 12 is jammed at the sheet conveying passage 65, the jammed sheet 12 may contact the nozzles 39 and there is a risk that ink endlessly oozes out from the nozzles 39 into the sheet 12. Typically, when the sheet 12 is jammed in the sheet conveying passage 65, the movable cover 145 is opened for the purpose of removing the jammed sheet 12. According to the present embodiment, the valve 89 is moved to the closing position when the movable cover 145 is opened, that is, when the sheet 12 is more likely to have been jammed in the sheet conveying passage 65. Hence, the above-described endless permeation of ink can be prevented.

Further, in a case where the sheet 12 is jammed at the sheet conveying passage 65, the jammed sheet 12 may contact the nozzles 39 and there is a risk that the ink in the nozzle 39 is endlessly oozed out into the sheet 12. Further, there is a possibility that the sheet tray 20 is pulled out of the housing 14 in a state where the sheet 12 is jammed in the sheet conveying passage 65. However, in such cases, the valve 89 is moved to the closing position in the present embodiment, thereby preventing the above-described endless ink permeation.

Further, when the housing 14 is separated from the installation surface (such as when the housing 14 is lifted up), meniscus of the nozzles 39 may be broken due to impact generated at the time of the separation, which leads to leakage of ink from the nozzles 39. In such a case, the valve 89 is moved to the closing position in the present embodiment, whereby ink leakage can be reduced.

[Modifications]

In the above-described embodiment, the valve 89 is firstly moved from the opening position to the closing position in the error process (S110 in FIG. 8). However, the valve 89 may be moved from the opening position to the closing position provided that the nozzles 39 and the sheet 12 face each other at the time of execution of the error process.

Figure 11:
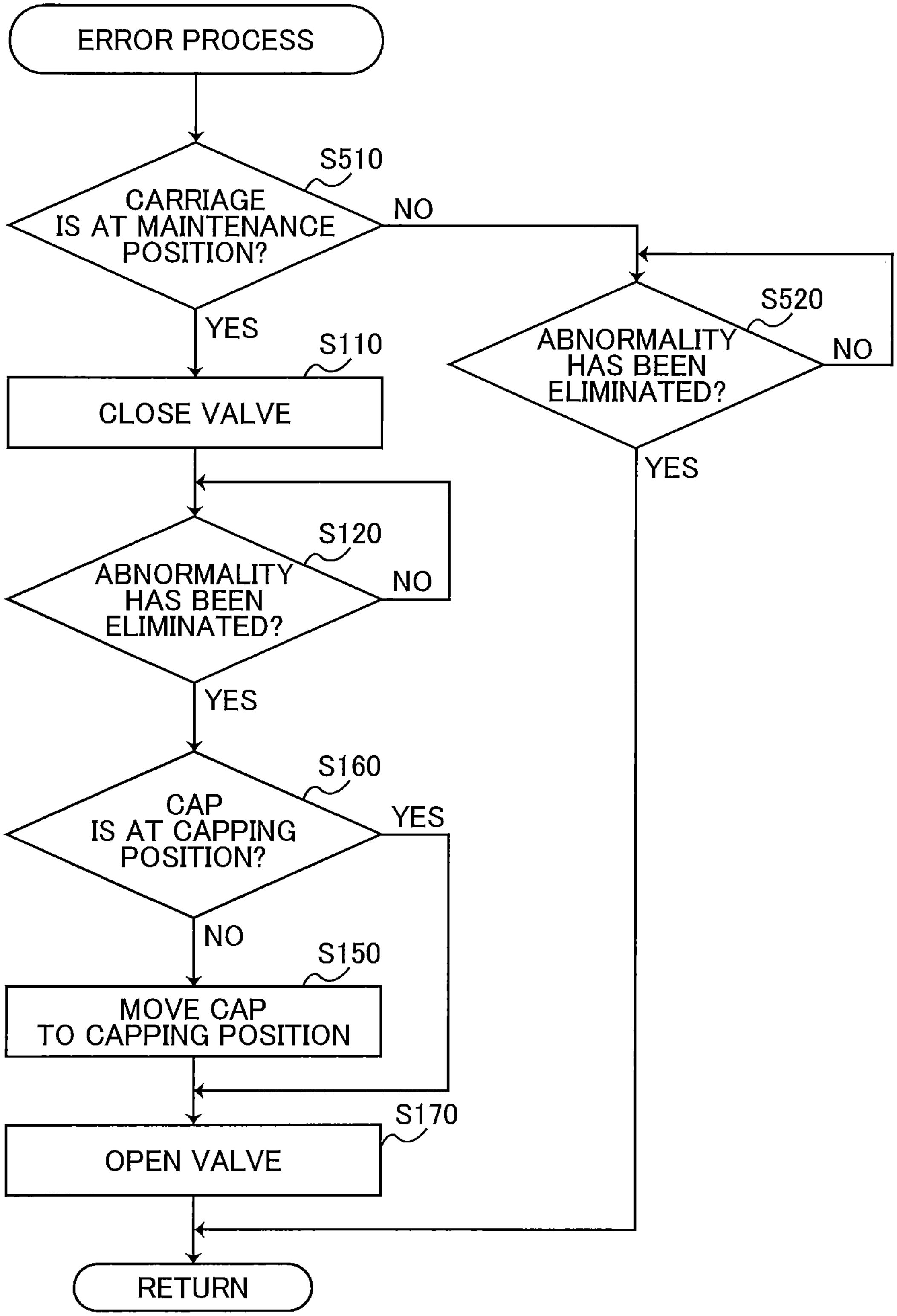
FIG. 11 is a flowchart illustrating an error process performed in a modification of the embodiment.

That is, as illustrated in the flowchart of FIG. 11, in the error process, the controller 130 firstly determines whether the carriage 40 is at the maintenance position (S510).

In a case where the carriage 40 is not at the maintenance position (S510: No), the controller 130 waits until an abnormality in the multifunction peripheral 10 is eliminated without moving the valve 89 to the closed position (S520: Yes). Then, the controller 130 terminates the error process.

On the other hand, in a case where the carriage 40 is at the maintenance position (S510: Yes), that is, in a case where there is a possibility that the nozzles 39 and the sheet 12 face each other, the controller 130 moves the valve 89 from the opening position to the closing position. (S110). Then, step S120 and subsequent steps are performed as in the error process performed in the above-described embodiment (see FIG. 8). However, in step S120 and subsequent steps, steps S130 and S140 in FIG. 8 is not performed since the carriage 40 has already been positioned at the maintenance position.

Incidentally, in a case where the carriage 40 is not at the maintenance position (S510: No), the controller 130 may move the valve 89 to the closing position after the controller 130 moves the carriage 40 to the maintenance position.

In a case where the multifunction peripheral 10 enters an abnormal state in a state where the nozzles 39 and the sheet 12 face each other, the sheet 12 is more likely to contact the nozzles 39. In a case where the valve 89 is at the opening position when the sheet 12 contacts the nozzles 39, ink in the nozzles 39 is likely to endlessly permeate into the sheet 12. However, in such a case, the valve 39 is moved to the closing position in the modification described above, thereby preventing the above-described endless ink permeation into the sheet 12.

In the above-described embodiment, a serial head type in which an image is recorded on a sheet while the head 38 is being moved by the carriage 40 is employed as an image recording system. However, a line head type is also available in which the recording unit 24 does not include the carriage 40 and an image is recorded on a sheet without moving the head 38. In a case where the line head type is employed, the head 38 extending over the length from the right edge to the left edge of the medium passing region 36 is provided. Further, the conveying process and the printing process are performed in parallel and continuously. That is, ink droplets are continuously ejected from the nozzles 39 while the sheet 12 is being conveyed. Further, the head 38 is fixed to a frame of the housing 14 in the line head type. This frame is an example of the support member.

Figure 12:
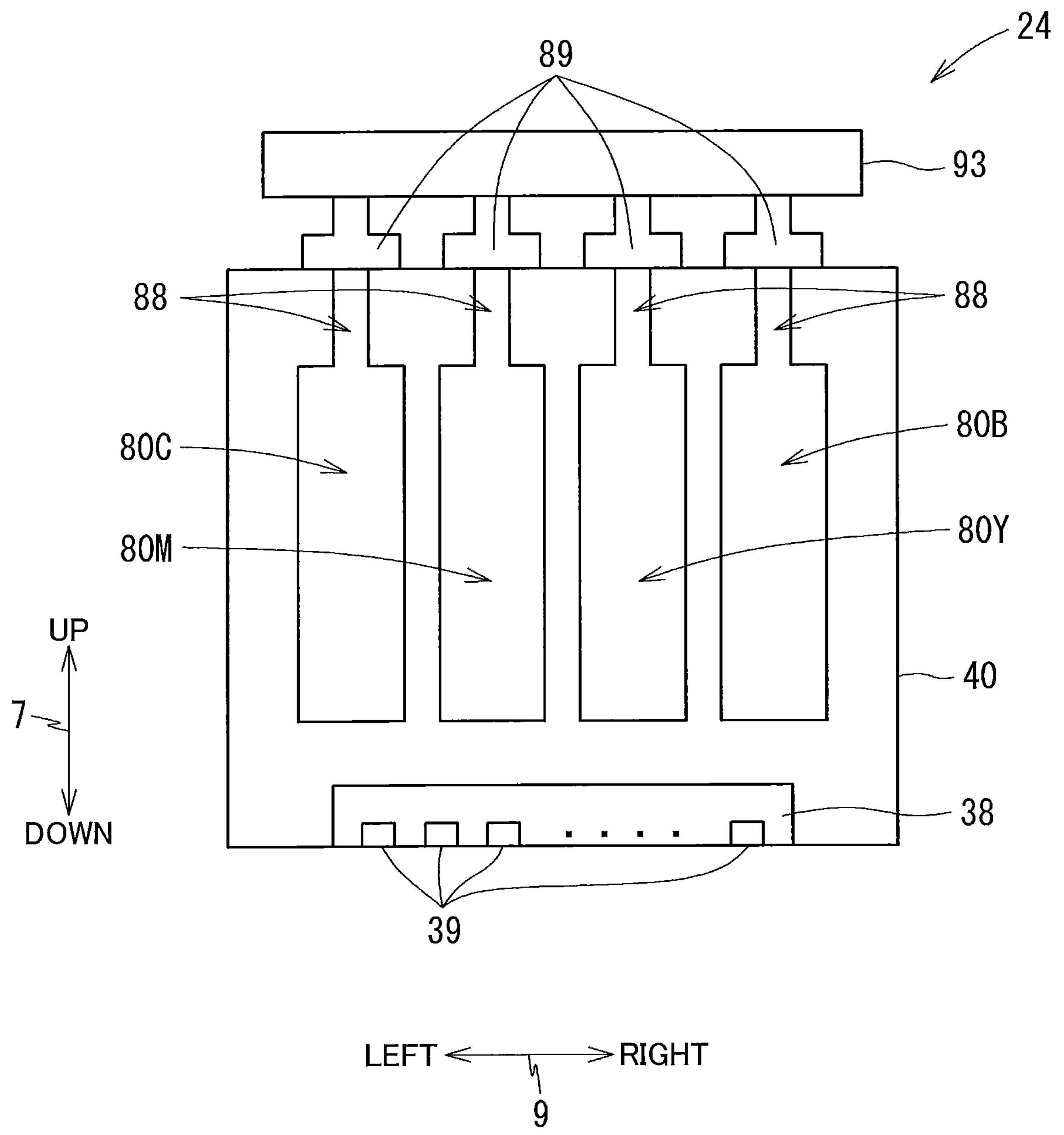
FIG. 12 is a vertical cross-sectional view of a recording unit 24 taken along a plane perpendicular to the front-rear direction 8 in another modification of the embodiment.

In the above-described embodiment, the storage portion 80 is singular. However, a plurality of storage portions 80 may be provided. For example, as illustrated in FIG. 12, the recording unit 24 may include four storage portions 80C, 80M, 80Y, 80B.

The storage portion 80C stores therein cyan ink. The storage portion 80M stores therein magenta ink. The storage portion 80Y stores therein yellow ink. The storage portion 80B stores therein black ink. The storage portions 80C, 80M, 80Y, 80B are arrayed in the left-right direction 9 in this order. Incidentally, the storage portions 80C, 80M, 80Y, 80B may be arrayed in a direction other than the left-right direction 9 such as in the front-rear direction 8. Further, the arrangement order of the storage portions 80C, 80M, 80Y, 80B is not limited to the order illustrated in FIG. 12. Further, the sizes of the storage portions 80C, 80M, 80Y, 80B may be equal to one another or may be different from one another.

The air communication opening 88 is formed in each of the storage portions 80C, 80M, 80Y, 80B. The valve 89 is provided for each of the four air communication openings 88. The four valves 89 are supported by a common solenoid 93 so as to be movable in the up-down direction 7. Incidentally, FIG. 12 illustrates a state where the four valves 89 are at their closing position. Further, illustration of a member supporting the solenoid 93 is omitted in FIG. 12. The four valves 89 are simultaneously moved from the opening positions to the closing positions by the supply of electrical current from the controller 130 to the solenoid 93. That is, all of the four air communication openings 88 are opened by the movement of the four valves 89 from the closing positions to the opening positions. Further, all of the four air communication openings 88 are closed by the movement of the four valves 89 from the opening positions to the closing positions.

According to the modification described above, an individual operation for providing communication between the inside and outside of the storage portion 80 and shutting off the communication is not required for each of the four storage portions 80. Therefore, a time period required to open and close the valves 89 can be reduced.

According to the modification, the single solenoid 93 is configured to move the plurality of valves 89 as described above. However, a plurality of solenoids 93 may be provided in one-to-one correspondence with the plurality of valves 89. In this case, the plurality of solenoids 93 moves the valves 89 at the same timing or at different timings.

The sheet 12 may be fed to the sheet conveying passage 65 from a tray other than the sheet tray 20. For example, instead of the sheet tray 20 of the multifunction peripheral 10, or in addition to the sheet tray 20, a tray pivotally movably supported by the upper surface or a side surface of the housing 14 may be provided. This tray is pivotally movable between an upright position in which the tray extends along the upper surface or the side surface of the housing 14 and an inclined position in which the tray is inclined relative to the upper surface or the side surface. When the tray is at the inclined position, at least one sheet 12 can be supported on the upper surface of the tray. The sheet 12 supported on the tray that is at the inclined position is fed to the sheet conveying passage 65 through an opening formed in the upper surface or the side surface of the housing 14 at which the tray is provided. In this case, needless to say, the controller 130 determines whether a feeding abnormality occurs with respect to the sheet 12 supported on the tray.

In the present embodiment, the storage portion 80 is assembled to the carriage 40, and replenishment of ink is performed by injecting ink through the ink inlet 83. However, the storage portion 80 is not limited to such a configuration. For example, the storage portion 80 may be a cartridge attachable to and detachable from the carriage 40. In the latter case, the cartridge is replaced with a new cartridge when ink in the cartridge has become low or run out.

In the present embodiment, the storage portion 80 is supported by the carriage 40. However, the storage portion 80 need not necessarily be supported by the carriage 40. For example, the storage portion 80 may be disposed at a portion of the multifunction peripheral 10 different from the disposed position of the carriage 40. In the latter case, the storage portion 80 and the head 38 is connected to each other by a tube, and ink stored in the storage portion 80 is supplied to the head 38 through the tube and the like. Further, in this case, at least a part of the storage portion 80 is positioned above the head 38.

While the description has been made in detail with reference to the specific embodiment and modifications, it would be apparent to those skilled in the art that various changes and modifications may be made thereto.

What is claimed is:

1. An inkjet recording device comprising:
a head comprising a nozzle configured to eject ink toward a recording medium;
a support member supporting the head;
a storage portion configured to store therein ink, the storage portion having a part positioned above the nozzle, the storage portion having an air communication opening allowing an interior of the storage portion to be communicated with an outside of the storage portion;
a valve movable between:
an opening position in which the valve opens the air communication opening; and
a closing position in which the valve closes the air communication opening;
an actuator configured to move the valve;
a state sensor configured to detect a state of the inkjet recording device and to output a detection signal based on the detected state; and
a controller configured to perform:
(a) ejecting, by controlling the head, ink from the nozzle toward the recording medium;
(b) maintaining the valve at the opening position during the ejecting in (a);
(c) determining, on the basis of the detection signal, whether the inkjet recording device has an abnormality during the ejecting in (a); and
(d) controlling, in a case where determination is made in (c) that the inkjet recording device has an abnormality, the actuator to move the valve to the closing position from the opening position.

2. The inkjet recording device according to claim 1,
wherein, in the maintaining in (b), the controller controls the actuator to maintain the valve at the opening position as long as the head is ejecting ink from the nozzle toward the recording medium and the controller is determining that the inkjet recording device has no abnormality on the basis of the detection signal.

3. The inkjet recording device according to claim 1,
wherein the controller further performs:
(e) determining, on the basis of the detection signal acquired after determination is made in (c) that the inkjet recording device has an abnormality, whether the abnormality is eliminated; and
(f) controlling, in a case where determination is made in (e) that the abnormality is eliminated, the actuator to move the valve to the opening position.

4. The inkjet recording device according to claim 3, further comprising a cap movable between:
a capping position in which the cap covers the nozzle; and
a separation position in which the cap is separated from the nozzle,
wherein the controller is configured to further perform:
(g) moving, in a case where determination is made in (e) that the abnormality is eliminated, the cap to the capping position to cause the cap to cover the nozzle, and
wherein the controlling in (f) is performed after the cap covers the nozzle by the moving in (g).

5. The inkjet recording device according to claim 3, further comprising:
a conveying passage along which the recording medium is conveyed;
a cover movable between:
a closed position in which the cover blocks the conveying passage from an outside; and
an open position in which the conveying passage is exposed to the outside; and
a receiving portion configured to:
receive from an outside an input indicating that the recording medium has been removed from the conveying passage; and
output, in response to receiving the input, an input signal to the controller,
wherein the state sensor comprises a cover sensor configured to:
output a close signal as the detection signal when the cover is at the closed position; and
output an open signal as the detection signal when the cover is at the open position, and
wherein, in the determining in (e), in a case where the controller acquires the close signal from the cover sensor after acquiring the open signal therefrom and acquires the input signal from the receiving portion, the controller determines that the abnormality is eliminated.

6. The inkjet recording device according to claim 1,
wherein the storage portion comprises a plurality of storage portions,
wherein the air communication opening comprises a plurality of air communication openings formed in one-to-one correspondence with the plurality of storage portions, and
wherein all of the plurality of air communication openings are closed when the valve is moved from the opening position to the closing position, and all of the plurality of air communication openings are opened when the valve is moved from the closing position to the opening position.

7. The inkjet recording device according to claim 1,
wherein the controller is configured to further perform:
(e) determining whether the nozzle and the recording medium face each other, and
wherein, in a case where determination is made in (c) that the inkjet recording device has an abnormality and determination is made in (e) that the nozzle and the recording medium face each other, the controlling in (d) is performed.

8. The inkjet recording device according to claim 1, further comprising a conveying passage along which the recording medium is conveyed in a conveying direction,
wherein the state sensor comprises a medium sensor positioned at the conveying passage, the medium sensor being disposed at one of a position upstream of the nozzle in the conveying direction and a position downstream of the nozzle in the conveying direction, the medium sensor being configured to:
output a medium presence signal as the detection signal when the recording medium is present at a disposed position in which the medium sensor is disposed; and
output a medium absence signal as the detection signal when the recording medium is absent from the disposed position.

9. The inkjet recording device according to claim 1,
wherein the support member is movable in a scanning direction, and
wherein the state sensor comprises an encoder configured to output a position signal as the detection signal, the position signal identifying a position in the scanning direction of the support member.

10. The inkjet recording device according to claim 1, further comprising:

a conveying passage along which the recording medium is conveyed; and a cover movable between:

a closed position in which the cover blocks the conveying passage from an outside; and an open position in which the conveying passage is exposed to the outside, wherein the state sensor comprises a cover sensor configured to:

output a close signal as the detection signal when the cover is at the closed position; and output an open signal as the detection signal when the cover is at the open position, and wherein, in the determining in (c), in a case where the controller acquires the open signal from the cover sensor, the controller determines that the inkjet recording device has an abnormality.

11. The inkjet recording device according to claim 1, further comprising:

a housing accommodating therein the head, the support member, the storage portion, the valve, the actuator, the state sensor, and the controller; and a tray movable between:

a sheet supply position in which the tray is capable of supporting the recording medium such that the recording medium is capable of being fed to a position in which image recordation is performed on the recording medium by the head; and a sheet non-supply position different from the sheet supply position, wherein the state sensor comprises a tray sensor configured to output:

a feeding possibility signal as the detection signal when the tray is at the sheet supply position; and a feeding impossibility signal as the detection signal when the tray is at the sheet non-supply position, and wherein, in the determining in (c), in a case where the detection signal acquired from the tray sensor is changed from the feeding possibility signal to the feeding impossibility signal, the controller determines that the inkjet recording device has an abnormality.

12. The inkjet recording device according to claim 1, further comprising a tray configured to support the recording medium, wherein, in the determining in (c), in a case where the controller determines on the basis of the detection signal that the recording medium is not supported on the tray, the controller determines that the inkjet recording device has an abnormality.

13. The inkjet recording device according to claim 1, further comprising a housing accommodating therein the head, the support member, the storage portion, the valve, the actuator, the state sensor, and the controller, wherein the state sensor comprises an installation sensor configured to:

output an installation signal as the detection signal when the housing is in contact with an installation surface; and output an uninstallation signal as the detection signal when the housing is not in contact with the installation surface, and wherein, in the determining in (c), in a case where the controller acquires the uninstallation signal from the installation sensor, the controller determines that the inkjet recording device has an abnormality.

14. The inkjet recording device according to claim 1, wherein the storage portion is supported by the support member.

* * * * *